(12) United States Patent
Fujimura et al.

(10) Patent No.: US 10,338,589 B2
(45) Date of Patent: Jul. 2, 2019

(54) CONTROLLER, DRIVING CONTROL METHOD, AND NON-TRANSITORY COMPUTER-READABLE RECORDING MEDIUM STORING A PROGRAM

(71) Applicant: Panasonic Intellectual Property Corporation of America, Torrance, CA (US)

(72) Inventors: Ryota Fujimura, Kanagawa (JP); Kazuki Kozuka, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 321 days.

(21) Appl. No.: 15/462,098

(22) Filed: Mar. 17, 2017

(65) Prior Publication Data
US 2017/0277184 A1    Sep. 28, 2017

Related U.S. Application Data

(60) Provisional application No. 62/313,210, filed on Mar. 25, 2016.

(30) Foreign Application Priority Data

Nov. 16, 2016    (JP) .................................. 2016-223019

(51) Int. Cl.
*G05D 1/00*   (2006.01)
*G06K 9/00*   (2006.01)
(Continued)

(52) U.S. Cl.
CPC ......... *G05D 1/0088* (2013.01); *B60W 10/184* (2013.01); *B60W 10/20* (2013.01);
(Continued)

(58) Field of Classification Search
None
See application file for complete search history.

(56) References Cited

U.S. PATENT DOCUMENTS 7,512,251 B2 *   3/2009   Nobori ...................... B60R 1/00
                                                  348/169
8,655,019 B2 *   2/2014   Kamiyama ............... B60R 1/00
                                                  348/148
(Continued)

FOREIGN PATENT DOCUMENTS

JP    2015-155295    8/2015

OTHER PUBLICATIONS

The Extended European Search Report dated Aug. 3, 2017 for European Patent Application No. 17162464.6.

*Primary Examiner* — Thomas G Black
*Assistant Examiner* — Demetra R Smith-Stewart
(74) *Attorney, Agent, or Firm* — Greenblum & Bernstein, P.L.C.

(57) ABSTRACT

A controller that controls driving of an autonomously moving vehicle includes a first sensor that detects an obstacle and a direction of travel of the vehicle, and a processor that sets a virtual region surrounding the vehicle. Processor stops the vehicle when the obstacle is detected therein, determines whether the obstacle is present in the direction of travel, determines whether the vehicle has been stopped for a predetermined amount of time when the obstacle is present, reduces a length of the virtual region in the direction of travel to provide an adjusted virtual region when the vehicle is determined to have been stopped for the predetermined amount of time, causes the vehicle to drive when the obstacle is not detected within the adjusted virtual region, and stops the vehicle when the obstacle is detected within the adjusted virtual region.

11 Claims, 21 Drawing Sheets

(51) Int. Cl.
    *B62D 15/02*         (2006.01)
    *G05D 1/02*          (2006.01)
    *G08G 1/0962*       (2006.01)
    *B60W 10/184*       (2012.01)
    *B60W 10/20*        (2006.01)
    *B60W 30/09*        (2012.01)

(52) U.S. Cl.
    CPC ........... *B60W 30/09* (2013.01); *B62D 15/021* (2013.01); *G05D 1/0214* (2013.01); *G05D 1/0246* (2013.01); *G05D 1/0274* (2013.01); *G05D 1/0278* (2013.01); *G05D 1/0285* (2013.01); *G06K 9/00805* (2013.01); *G06K 9/00818* (2013.01); *G08G 1/09623* (2013.01); *B60W 2420/42* (2013.01); *B60W 2520/04* (2013.01); *B60W 2520/06* (2013.01); *B60W 2550/402* (2013.01); *G05D 2201/0213* (2013.01)

(56) References Cited

U.S. PATENT DOCUMENTS

| | | | |
|---|---|---|---|
| 2003/0085999 A1* | 5/2003 | Okamoto | B60R 1/00 348/148 |
| 2014/0095009 A1 | 4/2014 | Oshima et al. | |
| 2015/0210279 A1 | 7/2015 | Agnew et al. | |
| 2017/0057475 A1* | 3/2017 | Lim | B60T 7/22 |

\* cited by examiner

CONTROLLER, DRIVING CONTROL METHOD, AND NON-TRANSITORY COMPUTER-READABLE RECORDING MEDIUM STORING A PROGRAM

BACKGROUND

1. Technical Field

The present disclosure relates to a driving control device that controls driving of a vehicle that moves autonomously, a driving control method, and a non-transitory computer-readable recording medium storing a driving control program.

2. Description of the Related Art

Recent years have seen advance in development of autonomously-driven vehicles. An autonomously-driven vehicle recognizes obstacles such as pedestrians in the vicinity of the autonomously-driven vehicle, and controls driving of the autonomously-driven vehicle in accordance with the results of the recognition.

For example, in order to detect an obstacle near the vehicle by at least one sensor, and determine whether or not the detected obstacle is a pedestrian nearby the vehicle, a collision-avoidance system has been disclosed in related art which performs pedestrian safety region maintaining operations, including at least one of data from the sensor being analyzed by a controller, a maximum separation distance from the pedestrian in which the vehicle can remain in the current driving lane being determined, a maximum state driving speed of the vehicle for passing the pedestrian being determined based on the maximum separation distance that can be used, steering the vehicle up to the maximum separation distance while the vehicle passes the pedestrian, and controlling the vehicle to a maximum safety speed. An example of this technology is described in Japanese Unexamined Patent Application Publication No. 2015-155295. However, the above-described related art has needed further improvement.

SUMMARY

In one general aspect, the techniques disclosed here feature a controller that controls driving of an autonomously moving vehicle. The controller includes a first sensor that detects an obstacle present in a periphery of the vehicle, and detects a direction of travel of the vehicle and a processor that sets a virtual region surrounding the periphery of the vehicle, the processor configured to stop the vehicle when changing from a state where the obstacle is not detected within the virtual region to a state where the obstacle is detected within the virtual region, determines whether or not the obstacle is present in the direction of travel of the vehicle, determines whether or not the vehicle has been stopped for a predetermined amount of time or longer when the obstacle is determined to be present in the direction of travel of the vehicle, reduces a length of the virtual region in the direction of travel to provide an adjusted virtual region when the vehicle is determined to have been stopped for the predetermined amount of time or longer, causes the vehicle to drive when the obstacle is not detected within the adjusted virtual region, and stops the vehicle when changing from a state where the obstacle is not detected within the adjusted virtual region to a state where the obstacle is detected within the adjusted virtual region.

According to the present disclosure, a distance to be maintained as to obstacles can be changed in accordance with the surrounding environment, and driving of the vehicle can be controlled so as not to impede passage of other vehicles.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
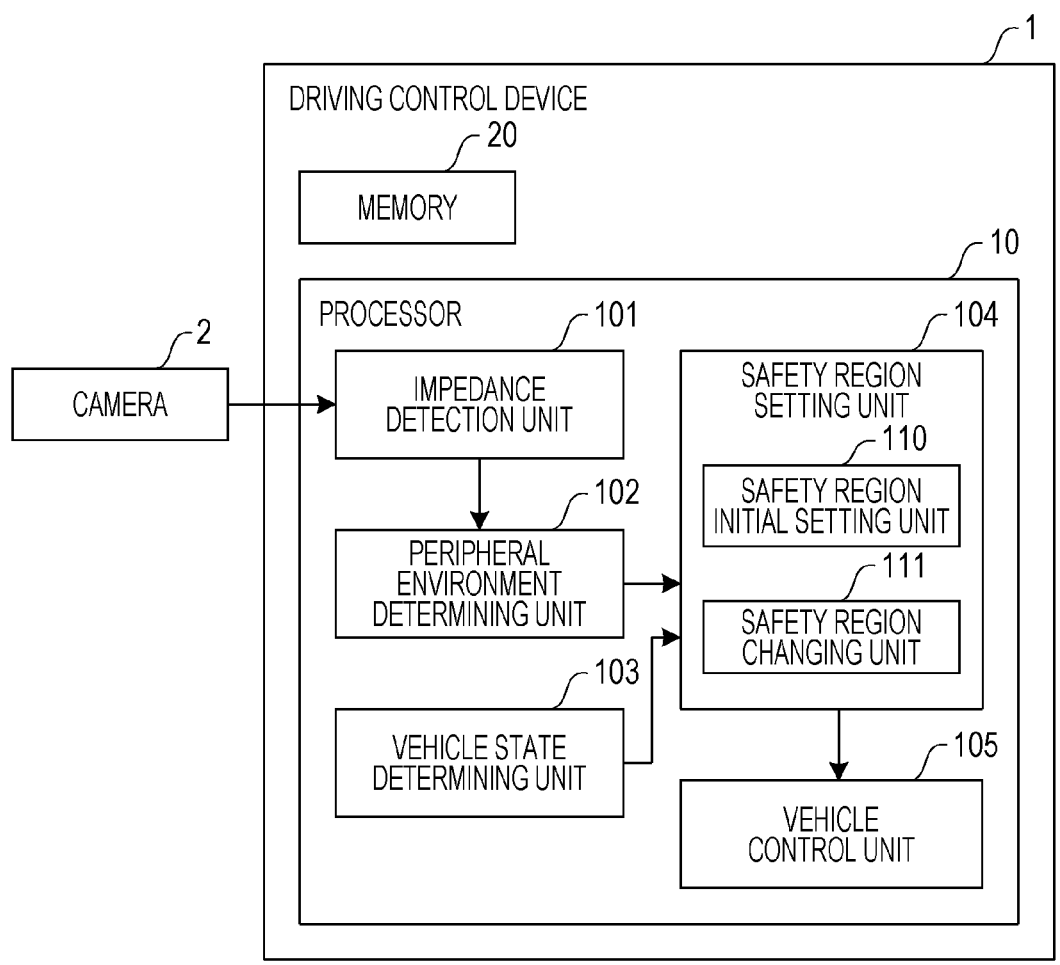
FIG. 1 is a block diagram illustrating the configuration of a vehicle control system according to a first embodiment.

Underlying Knowledge Forming Basis of the Present Disclosure

As described above, Japanese Unexamined Patent Application Publication No. 2015-155295 discloses a collision-avoidance system has been disclosed which performs pedestrian safety region maintaining operations, including at least one of data from the sensor being analyzed by a controller, a maximum separation distance from the pedestrian in which the vehicle can remain in the current driving lane being determined, a maximum state driving speed of the vehicle for passing the pedestrian being determined based on the maximum separation distance that is usable, steering the vehicle up to the maximum separation distance while the vehicle passes the pedestrian, and controlling the vehicle to a maximum safety speed, in order to detect an obstacle near the vehicle by at least one sensor, and determine whether or not the detected obstacle is a pedestrian nearby the vehicle.

However, the conventional collision-avoidance system assumes vehicles driving in driving lanes that are wide enough to ensure sufficient distance from pedestrians, and does not assume controlling the vehicle when driving in narrow lanes. For example, in a case where a pedestrian is present in the driving lane and the vehicle cannot maintain the maximum separation distance from a pedestrian, the conventional collision-avoidance system cannot pass the pedestrian, and instead keeps the vehicle stopped at a predetermined distance from the pedestrian, which may impede passage of other vehicles. Accordingly, the present inventor has studied the following improvements.

(1) A controller according to an aspect of the present disclosure controls driving of an autonomously moving vehicle. The controller includes a first sensor that detects an obstacle present in a periphery of the vehicle, and detects a direction of travel of the vehicle; and a processor that sets a virtual region surrounding the periphery of the vehicle, the processor configured to stop the vehicle when changing from a state where the obstacle is not detected within the virtual region to a state where the obstacle is detected within the virtual region, determines whether or not the obstacle is present in the direction of travel of the vehicle, determines whether or not the vehicle has been stopped for a predetermined amount of time or longer when the obstacle is determined to be present in the direction of travel of the vehicle, reduces a length of the virtual region in the direction of travel to provide an adjusted virtual region when the vehicle is determined to have been stopped for the predetermined amount of time or longer, causes the vehicle to drive when the obstacle is not detected within the adjusted virtual region, and stops the vehicle when changing from a state where the obstacle is not detected within the adjusted virtual region to a state where the obstacle is detected within the adjusted virtual region.

Accordingly, in a case where determination is made that an obstacle is present in the direction of travel of the vehicle, and also that the vehicle has been stopped for a predetermined amount of time or longer, the length of the portion of the virtual region in the direction of travel is reduced, so the distance that the vehicle keeps as to the obstacle can be changed in accordance with the surrounding environment. Further, the vehicle advances toward the obstacle with the virtual region maintained, so driving of the vehicle can be controlled without becoming a hindrance to passage of other vehicles.

(2) In the above aspect, the obstacle may be a person.

Accordingly, in a case where determination is made that a person is present in the direction of travel of the vehicle, and also that the vehicle has been stopped for a predetermined amount of time or longer, the length of the portion of the virtual region in the direction of travel is reduced, so the virtual region can be maintained while the vehicle gradually advances toward the person in accordance with the time that the vehicle has been stopped. Thus, a situation where the vehicle remains stopped can be prevented, and the person can be made to notice that the vehicle is approaching.

(3) In the above aspect, the obstacle may be another vehicle, and the processor may further reduce a width of the virtual region when the vehicle is determined to have been stopped for the predetermined amount of time or longer.

Accordingly, in a case where determination is made that another vehicle is present in the direction of travel of the vehicle, and also that the vehicle has been stopped for a predetermined amount of time or longer, the lengths of the portions of the virtual region in the direction of travel and the width direction are reduced, so in a case where another vehicle is present in the direction of travel, the length of the portion of the virtual region in the width direction is gradually reduced in accordance with the time that the vehicle has been stopped. Thus, the vehicle can overtake or pass other vehicles in a state where the virtual region is secured, and driving of the vehicle can be controlled without becoming a hindrance to passage of other vehicles.

(4) In the above aspect, the processor further may determine whether or not the vehicle has been driving at a predetermined speed or slower for a predetermined amount of time or longer when the vehicle is determined not to have been stopped for the predetermined amount of time or longer, and reduce a width of the virtual region when the vehicle is determined to have been driving at the predetermined speed or slower for the predetermined amount of time or longer.

Accordingly, in a case where determination is made that the vehicle has been moving at a very slow speed for a predetermined amount of time or longer, the lengths of the portions of the virtual region in the direction of travel and in the width direction are gradually reduced in accordance with the time that the vehicle is moving at a very slow speed, so the vehicle can pass the obstacle while gradually approaching the obstacle, and driving of the vehicle can be controlled without becoming a hindrance to passage of other vehicles.

(5) In the above aspect, the controller may further include memory that stores map information. The map information may include information of roads included in the map, and a width of each driving lane making up the roads. The processor may further determine whether or not a width of a driving lane that the vehicle is traveling on is narrower than a predetermined width, based on a current GPS location of the vehicle and the map information, reduce a width of the virtual region when the width of the driving lane is determined to be narrower than the predetermined width, and increase the width of the virtual region when the width of the driving lane is determined to be equal to or wider than the predetermined width.

Accordingly, in a case where the width of the driving lane is shorter than the predetermined length, the length of the virtual region is reduced in the width direction, so vehicles can pass each other even on narrow roads. Also, in a case where the width of the driving lane is equal to or longer than the predetermined length, the length of the virtual region is increased in the width direction in accordance with the length of the width of the driving lane, so the range where obstacle is not allowed to enter can be broadened, and safety can be further improved.

(6) In the above aspect, the controller may further include a second sensor that detects a steering angle of the vehicle. The processor may further modify a portion of the virtual region to have a radial angle in accordance with the detected steering angle and the direction of travel.

Accordingly, the steering angle of the vehicle is acquired, and the shape of the virtual region in the direction of travel is changed in accordance with the acquired steering angle, so the virtual region can be set in accordance with the direction of travel of the vehicle.

(7) In the above aspect, the processor may further control a driving speed of the vehicle in accordance with a size of the virtual region.

Accordingly, control is effected where the larger the area of the virtual region is, the faster the vehicle is caused to drive, so the speed of the vehicle can be easily controlled by reducing and enlarging the area of the virtual region.

(8) In the above aspect, the controller may further include memory. The memory may stores a correlation between various traffic signs and traffic rules corresponding to the traffic sights. The processor may further recognize a sign included in an image captured by a camera provided to the vehicle when the vehicle is determined to have been stopped for the predetermined amount of time of longer, extract a traffic rule corresponding to the recognized sign based on the correlation, determine whether or not the vehicle can drive under the extracted traffic rule, and reduce a length of the virtual region in the direction of travel when it is determined that the vehicle can drive under the extracted traffic rule.

Accordingly, determination is made regarding whether or not the vehicle can drive based on traffic rules corresponding to traffic signs near the vehicle, and in a case where determination is made that the vehicle can drive, the length of the portion of the virtual region in the direction of travel is reduced, so driving of the vehicle can be controlled while obeying traffic rules in a sure manner.

(9) In the above aspect, the processor may further receive detection results, from a third sensor that is installed outside of the vehicle, in the direction of travel of the vehicle, and has a different detection range from the first sensor, indicating whether or not the obstacle is present at a periphery of the third sensor, and increase a length of the virtual region in the direction of travel, when detection results from the first sensor indicate that the obstacle is not present in the direction of travel of the vehicle, and the detection results received from the third sensor indicate that the obstacle is present at the periphery of the third sensor.

Accordingly, obstacles present in blind points to the vehicle are detected, so in a case where determination is made from the detection results of the sensor in the vehicle that there are not obstacles in the direction of travel, and detection results indicating that an obstacle is present are acquired from a sensor on the outside of the vehicle, obstacles can be detected earlier by extending the length of the virtual region in the direction of travel, so safety can be improved even further.

(10) A method according to another aspect of the present disclosure is a method of controlling driving of an autonomously moving vehicle. The method includes: setting a virtual region surrounding a periphery of the vehicle using a processor included in the vehicle, the processor configured to stop the vehicle when changing from a state where the obstacle is not detected within the virtual region to a state where the obstacle is detected within the virtual region; determining, using the processor, whether or not the obstacle is present in the direction of travel of the vehicle; determining, using the processor, whether or not the vehicle has been stopped for a predetermined amount of time or longer when the obstacle is determined to be detected in the direction of travel of the vehicle; reducing a length of the virtual region in the direction of travel to provide an adjusted virtual region when the vehicle is determined to have been stopped for the predetermined amount of time or longer; causing the vehicle to drive when the obstacle is not detected within the adjusted virtual region; and stopping the vehicle when changing from a state where the obstacle is not detected within the adjusted virtual region when the obstacle is detected within the adjusted virtual region.

Accordingly, in a case where determination is made that an obstacle is present in the direction of travel of the vehicle, and also that the vehicle has been stopped for a predetermined amount of time or longer, the length of the portion of the virtual region in the direction of travel is reduced, so the distance that the vehicle keeps as to the obstacle can be changed in accordance with the surrounding environment. Further, the vehicle advances toward the obstacle with the virtual region maintained, so driving of the vehicle can be controlled without becoming a hindrance to passage of other vehicles.

(11) A non-transitory computer-readable recording medium according to present disclosure stores a program controlling driving of an autonomously moving vehicle. The program causes a processor to set a virtual region surrounding a periphery of the vehicle, the processor configured to stop the vehicle when changing from a state where the obstacle is not detected within the virtual region to a state where the obstacle is detected within the virtual region, determine whether or not the obstacle is present in the direction of travel of the vehicle, determine whether or not the vehicle has been stopped for a predetermined amount of time or longer when the obstacle is determined to be detected in the direction of travel of the vehicle, reduce a length of the virtual region in the direction of travel to provide an adjusted virtual region when the vehicle is determined to have been stopped for the predetermined amount of time or longer, cause the vehicle to drive when the obstacle is not detected within the adjusted virtual region, and stop the vehicle when changing from a state where the obstacle is not detected within the adjusted virtual region to a state where the obstacle is detected within the adjusted virtual region.

Accordingly, in a case where determination is made that an obstacle is present in the direction of travel of the vehicle, and also that the vehicle has been stopped for a predetermined amount of time or longer, the length of the portion of the virtual region in the direction of travel is reduced, so the distance that the vehicle keeps as to the obstacle can be changed in accordance with the surrounding environment. Further, the vehicle advances toward the obstacle with the virtual region maintained, so driving of the vehicle can be controlled without becoming a hindrance to passage of other vehicles.

Embodiments of the present disclosure will be described below with reference to the drawings. Note that the following embodiments are example of substantiation of the present disclosure, and do not restrict the technical scope of the present disclosure.

First Embodiment

FIG. 1 is a block diagram illustrating the configuration of a vehicle control system according to a first embodiment. The vehicle control system illustrated in FIG. 1 has a driving control device 1 and a camera 2. The driving control device 1 controls driving of an autonomously-traveling vehicle. Note that while the vehicle is an automobile here, the present disclosure is not particularly restricted to this arrangement. The vehicle can be any of a wide variety of vehicles, including motorcycles, trucks, busses, trains, flying objects, and so forth.

The camera 2 is mounted in or on the vehicle, and shoots images of the periphery of the vehicle. The camera 2 shoots image in front of, behind, and to the right and left sides of the vehicle.

The driving control device 1 is installed in the vehicle. The driving control device 1 includes a processor 10 and memory 20. The memory 20 is a computer-readable recording medium, examples of which include a hard disk drive, read-only memory (ROM), random access memory (RAM), optical discs, semiconductor memory, and so forth. The memory 20 stores a driving control program executed by the processor 10.

The processor 10 is, for example, a central processing unit (CPU), and executes the driving control program stored in the memory 20. The processor 10 includes an obstacle detecting unit 101, a peripheral environment determining unit 102, a vehicle state determining unit 103, a safety region setting unit 104, and a vehicle control unit (driving control unit) 105.

The obstacle detecting unit 101 detects obstacles that are present in the periphery of the vehicle, based on images shot by the camera 2. Examples of obstacles are people and other vehicles. The obstacle detecting unit 101 detects people that are present in the periphery of the vehicle, and also detects other vehicles that are present in the periphery of the vehicle.

The peripheral environment determining unit 102 determines whether or not an obstacle is present in the direction of travel of the vehicle, based on the detection results by the obstacle detecting unit 101. The peripheral environment determining unit 102 detects whether or not a person is present in the direction of travel of the vehicle, based on the detection results by the obstacle detecting unit 101. The peripheral environment determining unit 102 also detects whether or not another vehicle is present in the direction of travel of the vehicle, based on the detection results by the obstacle detecting unit 101.

In a case where determination is made that an obstacle is present in the direction of travel of the vehicle, the vehicle state determining unit 103 determines whether or not the vehicle has been stopped for a predetermined amount of time. In a case of having determined that the vehicle has not been stopped for a predetermined amount of time, the vehicle state determining unit 103 determines whether or not the vehicle has been moving at a very slow speed for a predetermined amount of time. This moving at a very slow speed means traveling at a speed at which the vehicle can come to an immediate stop. The vehicle state determining unit 103 determines whether or not the vehicle is traveling at a speed of 10 kilometers per hour or slower, for example, for a predetermined amount of time.

The safety region setting unit 104 includes a safety region initial setting unit (region initial setting unit) 110 and a safety region changing unit (region changing unit) 111. The safety region initial setting unit 110 performs initial settings of a safety region (stop determination region) that is defined surrounding the vehicle. The vehicle is stopped immediately before an obstacle is detected inside the safety region. In a case where determination is made that the vehicle has been stopped for a predetermined amount of time, the safety region changing unit 111 reduces the length of the safety region at the portion in the direction of travel.

Figure 2:
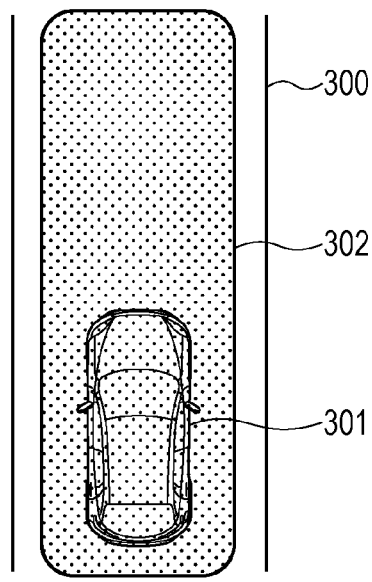
FIG. 2 is a diagram illustrating an example of a safety region initially set.

FIG. 2 is a diagram illustrating an example of a safety region that has been initially set. In a case where a vehicle 301 travels along a road 300, the safety region initial setting unit 110 performs initial settings of a safety region 302 such as illustrated in FIG. 2. The safety region 302 to be initially set is stored in memory 20 beforehand. The safety region 302 is defined in a virtual manner surrounding the vehicle, and is used to determine whether or not to stop the vehicle. The safety region 302 is rectangular in shape, and has predetermined lengths from the vehicle 301 ahead of, behind, and to the right and left sides of the vehicle 301. The portion of the safety region 302 in the direction of travel of the vehicle is longer than the safety region 302 in the direction opposite to the direction of travel. Ahead of the vehicle 301 is the direction of travel in FIG. 2.

In a case where determination is made that there is a person in the direction of travel of the vehicle and that the vehicle has been stopped for a predetermined amount of time, the safety region changing unit 111 reduces the length of the portion of the safety region in the direction of travel by a predetermined length. That is to say, in a case where determination is made that there is a person in the direction of travel of the vehicle and that the vehicle has been stopped for a predetermined amount of time, the safety region changing unit 111 reduces the length of the portion of the safety region in the direction of travel in stages by a predetermined amount every predetermined amount of time. Note that the predetermined length of reduction is shorter than the length of the portion of the safety region in the direction of travel of the vehicle, and is a predetermined percentage of length as to the length of the portion of the safety region in the direction of travel of the vehicle. A lower limit value indicating the extent of how far the safety region can be reduced is decided beforehand, and once the length of the portion of the safety region in the direction of travel of the vehicle has reached this lower limit value, no more reduction is made beyond the lower limit value.

Figure 3:
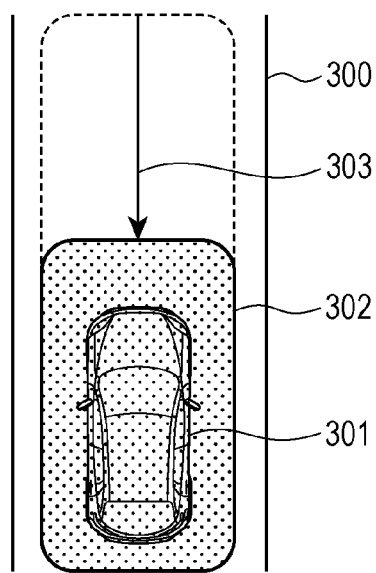
FIG. 3 is a diagram illustrating an example of a safety region of which the length in the direction of travel is reduced.

FIG. 3 is a diagram illustrating an example of reducing the length of the portion of the safety region in the direction of travel. In a case where determination has been made that there is a person in the direction of travel of the vehicle and that the vehicle has been stopped for a predetermined amount of time, the safety region changing unit 111 reduces the length of the portion of the safety region 302 in the direction of travel in the direction of an arrow 303 in stages, every predetermined amount of time, as illustrated in FIG. 3.

In a case where determination is made that there is another vehicle in the direction of travel of the vehicle and that the vehicle has been stopped for a predetermined amount of time, the safety region changing unit 111 reduces the length of the portion of the safety region in the direction of travel and in the width direction by a predetermined length. That is to say, in a case where determination is made that there is another vehicle in the direction of travel of the vehicle and that the vehicle has been stopped for a predetermined amount of time, the safety region changing unit 111 reduces the length of the portion of the safety region in the direction of travel and in the width direction in stages by a predetermined amount every predetermined amount of time. Note that the predetermined length of reduction of the portion of the safety region in the direction of travel of the vehicle and the predetermined length of reduction of the portion of the safety region in the width direction may be different. The predetermined length of reduction of the portion in the direction of travel of the vehicle is shorter than the length of the portion of the safety region in the direction of travel of the vehicle, and is a predetermined percentage of length as to the length of the portion of the safety region in the direction of travel of the vehicle. A lower limit value indicating the extent of how far the safety region can be reduced is decided beforehand, and once the length of the portion of the safety region in the direction of travel of the vehicle has reached this lower limit value, no more reduction is made beyond the lower limit value. The predetermined length of reduction of the portion in the width direction is shorter than the length of the portion of the safety region in the width direction of travel of the vehicle, and is a predetermined percentage of length as to the length of the portion of the safety region in the width direction. A lower limit value indicating the extent of how far the safety region can be reduced is decided beforehand, and once the length of the portion of the safety region in the width direction has reached this lower limit value, no more reduction is made beyond the lower limit value.

Figure 4:
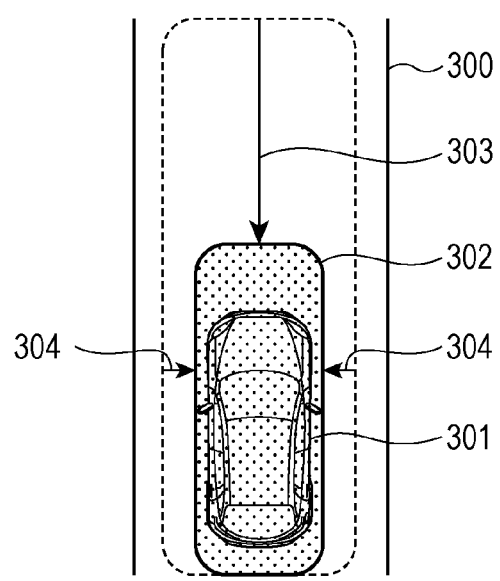
FIG. 4 is a diagram illustrating an example of a safety region of which the length in the direction of travel and the length in the width direction is reduced.

FIG. 4 is a diagram illustrating an example of reducing the length of the portions of the safety region in the direction of travel and in the width direction. In a case where determination has been made that there is another vehicle in the direction of travel of the vehicle and that the vehicle has been stopped for a predetermined amount of time, the safety region changing unit 111 reduces the length of the portion of the safety region 302 in the direction of travel in the direction of the arrow 303 in stages by a predetermined amount, every predetermined amount of time, and reduces the length of the portion of the safety region 302 in the width direction in the direction of an arrow 304 in stages by a predetermined amount, every predetermined amount of time, as illustrated in FIG. 4.

In a case where determination is made that there is a person in the direction of travel of the vehicle and that the vehicle has been moving at a very slow speed for a predetermined amount of time, the safety region changing unit 111 further reduces the length of the portion of the safety region in the direction of travel and in the width direction by a predetermined length. That is to say, in a case where determination is made that there is a person in the direction of travel of the vehicle and that the vehicle has been moving at a very slow speed for a predetermined amount of time, the safety region changing unit 111 reduces the length of the portion of the safety region in the direction of travel and in the width direction in stages by a predetermined amount every predetermined amount of time. Note that the predetermined length of reduction of the portion of the safety region in the direction of travel of the vehicle and the predetermined length of reduction of the portion of the safety region in the width direction may be different. The predetermined length of reduction of the portion in the direction of travel of the vehicle is shorter than the length of the portion of the safety region in the direction of travel of the vehicle, and is a predetermined percentage of length as to the length of the portion of the safety region in the direction of travel of the vehicle. A lower limit value indicating the extent of how far the safety region can be reduced is decided beforehand, and once the length of the portion of the safety region in the direction of travel of the vehicle has reached this lower limit value, no more reduction is made beyond the lower limit value. The predetermined length of reduction of the portion in the width direction is shorter than the length of the portion of the safety region in the width direction of travel of the vehicle, and is a predetermined percentage of length as to the length of the portion of the safety region in the width direction. A lower limit value indicating the extent of how far the safety region can be reduced is decided beforehand, and once the length of the portion of the safety region in the width direction has reached this lower limit value, no more reduction is made beyond the lower limit value.

The vehicle control unit 105 causes the vehicle to be autonomously driven. The vehicle control unit 105 causes the vehicle to be driven such that no obstacles are detected within the safety region, and stops the vehicle immediately before an obstacle is detected within the safety region.

The vehicle control unit 105 also controls the vehicle such that the larger the area of the safety region is, the faster the speed of the vehicle is. For example, the vehicle control unit 105 may calculate the speed of the vehicle based on the following Expression (1).

$$\text{Speed}(\text{area of safety region} \times \text{coefficient})^{1/2} \quad (1)$$

Accordingly, the larger the area of the safety region is, the faster the speed of the vehicle is, and the smaller the area of the safety region is, the slower the speed of the vehicle is. When there is no obstacle in the direction of travel, the area of the safety region is large so the speed increases, and when there is an obstacle in the direction of travel, the area of the safety region is small so the speed decreases, thereby improving safety.

Figure 5:
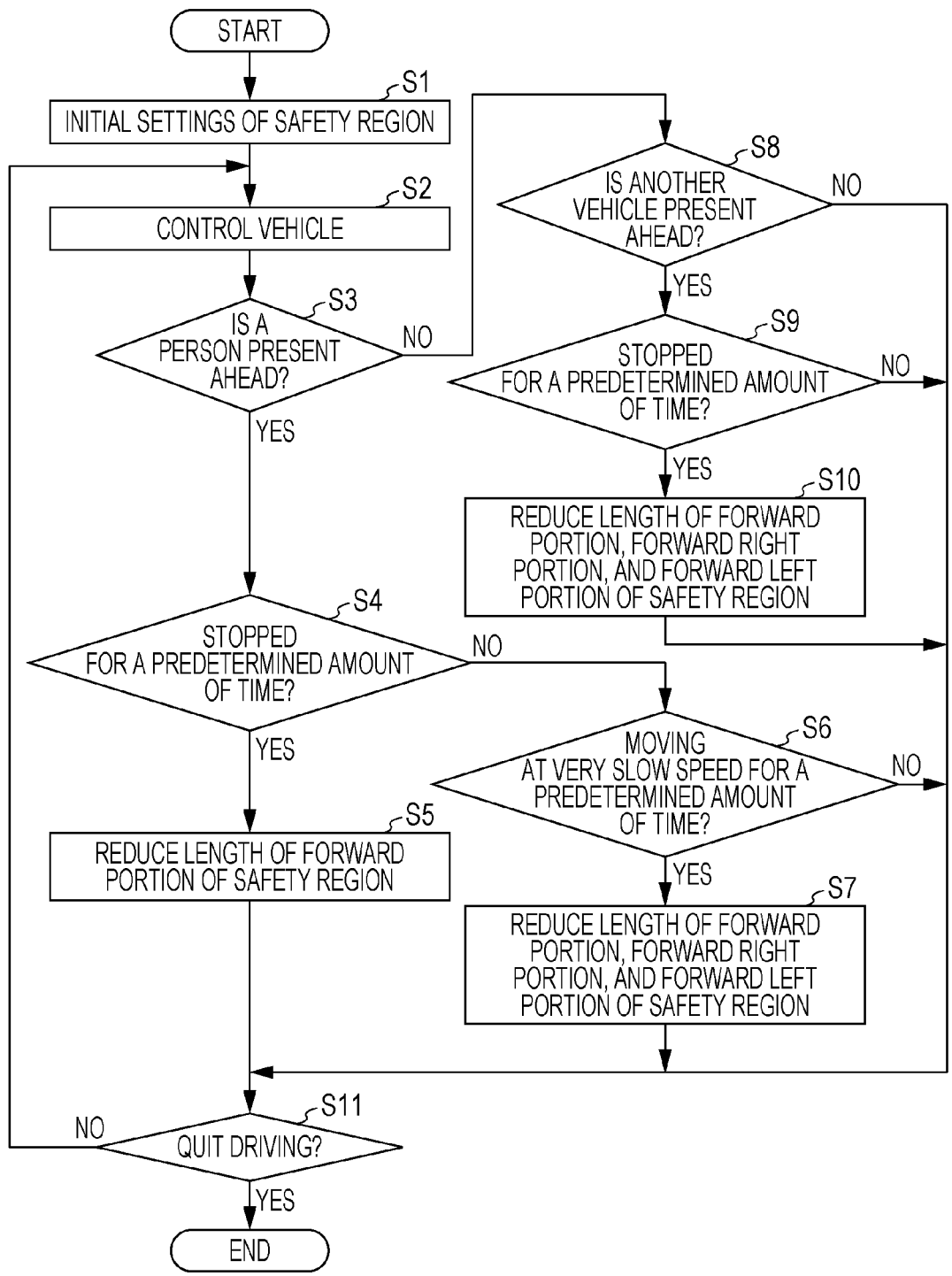
FIG. 5 is a flowchart for describing operations of a driving control device according to the first embodiment.

Next, operations of the driving control device according to the first embodiment will be described. FIG. 5 is a flowchart for describing operations of the driving control device according to the first embodiment.

First, in step S1, the safety region initial setting unit 110 performs initial settings of the safety region when starting driving. The initially-set safety region has a predetermined length ahead of the vehicle, a predetermined length to the left of the vehicle, a predetermined length to the right of the vehicle, and a predetermined length behind the vehicle.

Next, in step S2, the vehicle control unit 105 causes the vehicle to be autonomously driven such that no obstacles are detected within the safety region. The vehicle control unit 105 stops the vehicle immediately before an obstacle is detected within the safety region.

Next, in step 3, the peripheral environment determining unit 102 determines whether or not there is a person present ahead of the vehicle. Assuming that the direction of travel of the vehicle is forward, and determination is made here that there is a person present ahead of the vehicle (YES in step S3), the vehicle state determining unit 103 determines in step S4 whether or not the vehicle has been stopped for a predetermined amount of time. Note that the vehicle state determining unit 103 can determine whether or not the vehicle has been stopped for a predetermined amount of time by acquiring the speed of the vehicle from a speed sensor (omitted from illustration) that the vehicle has.

In a case where determination is made that the vehicle has been stopped for a predetermined amount of time (YES in step S4), in step S5 the safety region changing unit 111 reduces the length of the front portion of the safety region by a predetermined length.

On the other hand, in a case where determination is made that the vehicle has not been stopped for a predetermined amount of time (NO in step S4), in step S6 the vehicle state determining unit 103 determines whether or not the vehicle has been moving at a very slow speed for a predetermined amount of time. Note that the vehicle state determining unit 103 can determine whether or not the vehicle has been moving at a very slow speed for a predetermined amount of time by acquiring the speed of the vehicle from a speed sensor (omitted from illustration) that the vehicle has.

In a case where determination is made that the vehicle has been moving at a very slow speed for a predetermined amount of time (YES in step S6), in step S7 the safety region changing unit 111 reduces the lengths of the forward portion, right portion, and left portion of the safety region by a predetermined length. On the other hand, in a case where determination is made that the vehicle has not been moving at a very slow speed for a predetermined amount of time (NO in step S6), the flow advances to the processing in step S11.

In a case where determination is made in step S3 that no person is present ahead of the vehicle (NO in step S3), the peripheral environment determining unit 102 determines in step S8 whether or not another vehicle is present ahead of the vehicle. In a case where determination is made that another vehicle is present ahead of the vehicle (YES in step S8), the vehicle state determining unit 103 determines in step S9 whether or not the vehicle has been stopped for a predetermined amount of time.

In a case where determination is made that the vehicle has been stopped for a predetermined amount of time (YES in step S9), in step S10 the safety region changing unit 111 reduces the lengths of the forward portion, right portion, and left portion of the safety region by a predetermined length.

On the other hand, in a case where determination is made that another vehicle is not present ahead of the vehicle (NO in step S8), or the vehicle has not been stopped for a predetermined amount of time (NO in step S9), the flow advances to the processing of step S11.

Next, the vehicle control unit 105 determines in step S11 whether or not to quit driving of the vehicle. In a case where determination is made to end driving of the vehicle (YES in step S11), the flow ends. On the other hand, in a case where determination is made not to quit driving the vehicle (NO in step S11), the flow returns to the processing in step S2.

Figure 6:
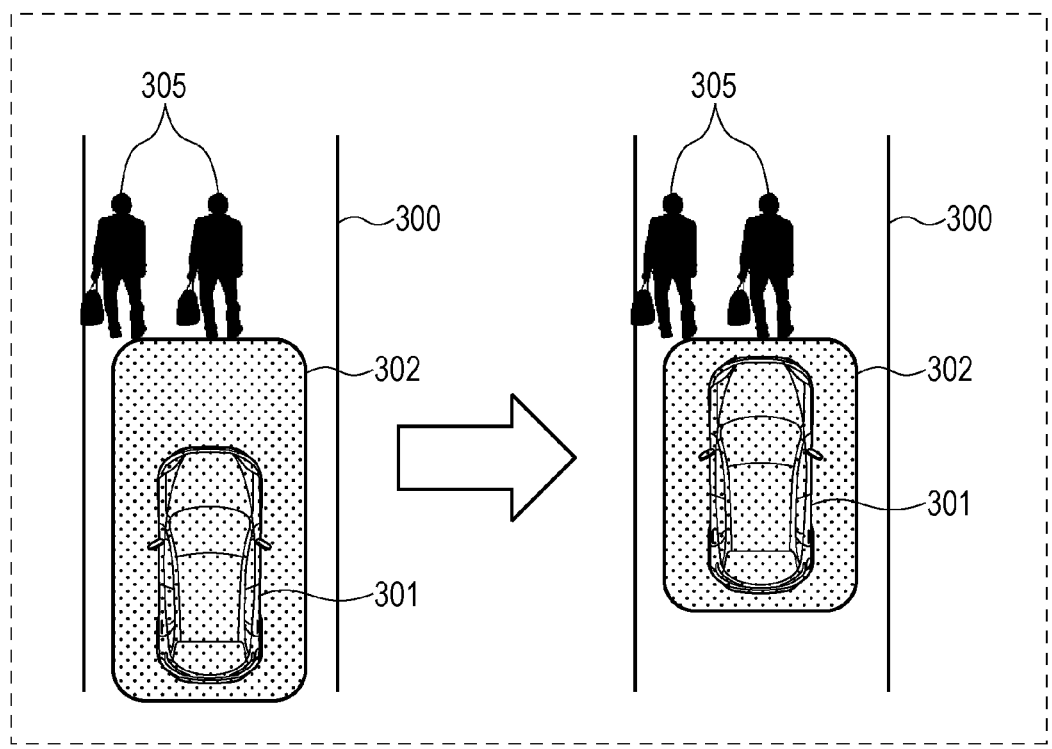
FIG. 6 is a diagram for describing processing of reducing the safety region in a case where a person is present in front of the vehicle.

FIG. 6 is a diagram for describing processing of reducing the safety region in a case where a person is present in front of the vehicle. FIG. 6 shows that there are persons 305 present on the road 300. The persons 305 are not moving. In this case, the vehicle 301 stops, and maintains the safety region 302. In a case where determination is made that there is a person 305 ahead of the vehicle 301 and that the vehicle 301 has been stopped for a predetermined amount of time, the safety region changing unit 111 reduces the forward portion of the safety region 302 by a predetermined length. Reducing the forward portion of the safety region 302 by a predetermined length enables the vehicle 301 to move forwards. The vehicle 301 moves to near the person 305, and stops maintaining the safety region 302 again. The length of the forward portion of the safety region 302 gradually is reduced each time the predetermined amount of time passes, so the vehicle 301 gradually nears the person 305. Due to the vehicle 301 coming near to the person 305, the person 305 can notice the vehicle 301 coming near and move to the side of the road 300 so as to not impede passage of the vehicle 301, so the vehicle 301 can pass.

Figure 7:
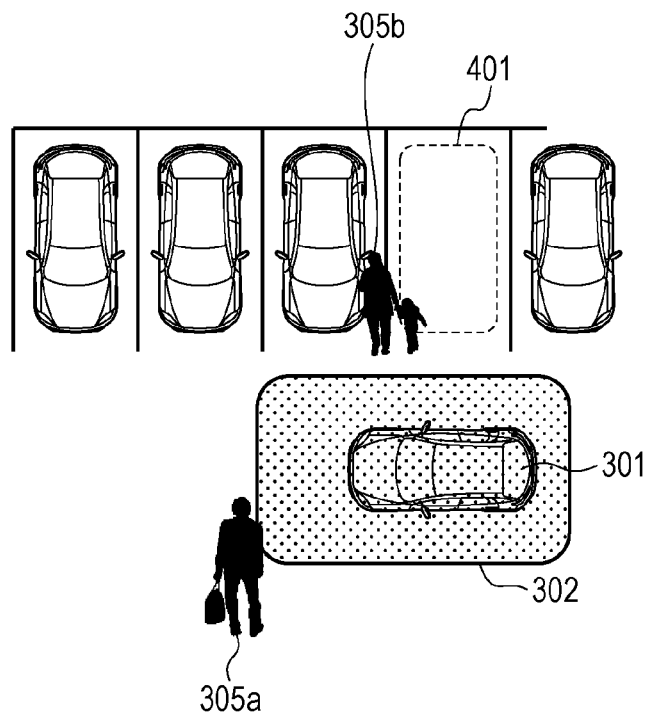
FIG. 7 is a diagram illustrating processing of changing the shape of the safety region when parking the vehicle in a parking space.
Figure 8:
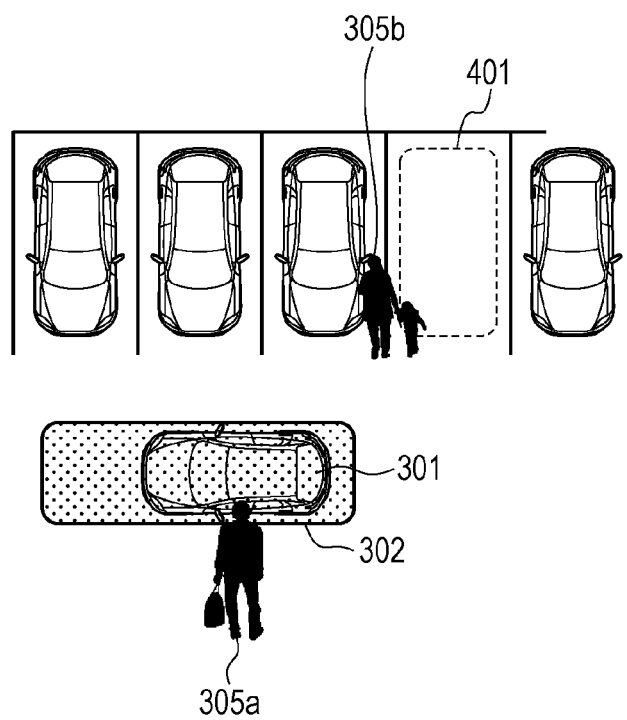
FIG. 8 is a diagram illustrating an example of reducing the length of the width direction portion of the safety region when parking the vehicle in a parking space.
Figure 9:
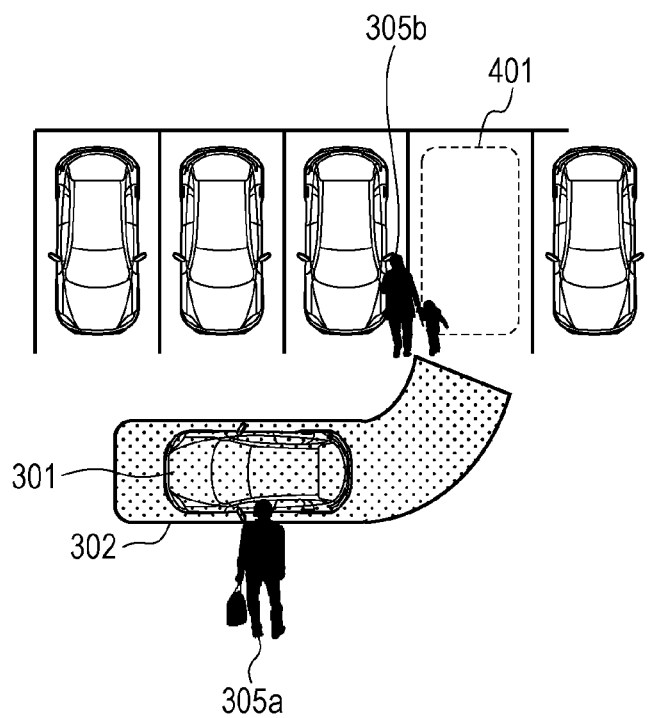
FIG. 9 is a diagram illustrating an example of changing the shape of the portion of the safety region in the direction of travel when parking the vehicle in a parking space.
Figure 10:
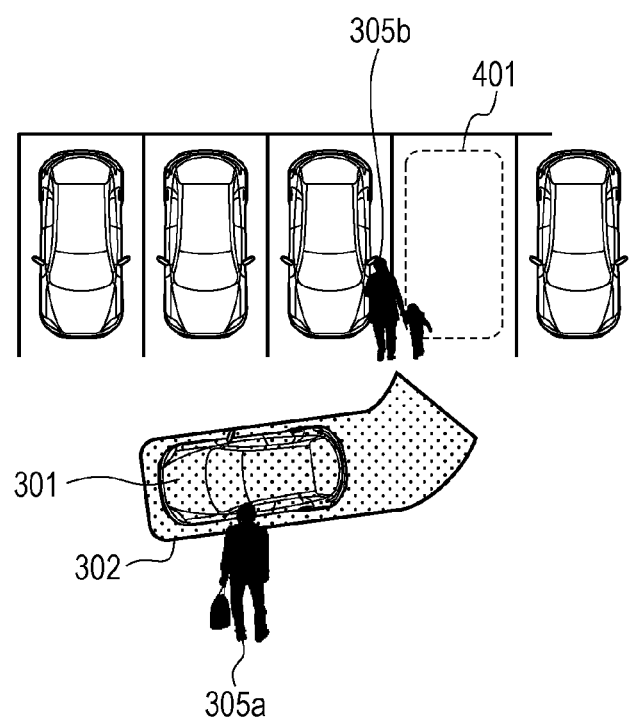
FIG. 10 is a diagram illustrating an example of reducing the length of the portion of the safety region in the direction of travel when parking the vehicle in a parking space.

Note that the safety region changing unit 111 may acquire the steering angle of the vehicle, and change the shape of the safety region in the direction of travel in accordance with the acquired steering angle according to the first embodiment. FIG. 7 is a diagram illustrating processing of changing the shape of the safety region when parking the vehicle in a parking space. FIG. 8 is a diagram illustrating an example of reducing the length of the width portion of the safety region when parking the vehicle in a parking space. FIG. 9 is a diagram illustrating an example of changing the shape of the portion of the safety region in the direction of travel when parking the vehicle in a parking space. FIG. 10 is a diagram illustrating an example of reducing the length of the portion of the safety region in the direction of travel when parking the vehicle in a parking space. Examples of the vehicle 301 parking in a parking space 401 will be described in FIGS. 7 through 10.

If a person 305a is present in the direction of travel of the vehicle 301 when the vehicle 301 is traveling forward as illustrated in FIG. 7, the vehicle 301 stops and maintains the safety region 302. The length of the width portion of the safety region 302 is reduced at this time as illustrated in FIG. 8, so the vehicle 301 can advance without the person 305a entering the safety region 302.

Next, the vehicle 301 advances backwards to park in the parking space 401, as illustrated in FIG. 9. At this time, the safety region changing unit 111 acquires the steering angle of the vehicle 301, and changes the shape of the safety region 302 in the direction of travel, in accordance with the acquired steering angle. The vehicle 301 turns to the left with regard to the direction of travel (backwards) in FIG. 9, so the back portion of the safety region 302 changes in shape toward the left direction.

Thereafter, the vehicle 301 travels backward, but if there is a person 305b in the direction of travel of the vehicle 301, the vehicle 301 stops and maintains the safety region 302. The length of the back portion of the safety region 302 is gradually reduced at this time as illustrated in FIG. 10, in accordance with the predetermined time, so the vehicle 301 gradually draws closer to the person 305b. The person 305b then moves to a position where they are not in the safety region 302, and thus the vehicle 301 can be parked in the parking space 401.

Second Embodiment

A second embodiment will be described. In the second embodiment, the length of the width portion of the safety region is changed in accordance with the width of the driving lane.

Figure 11:
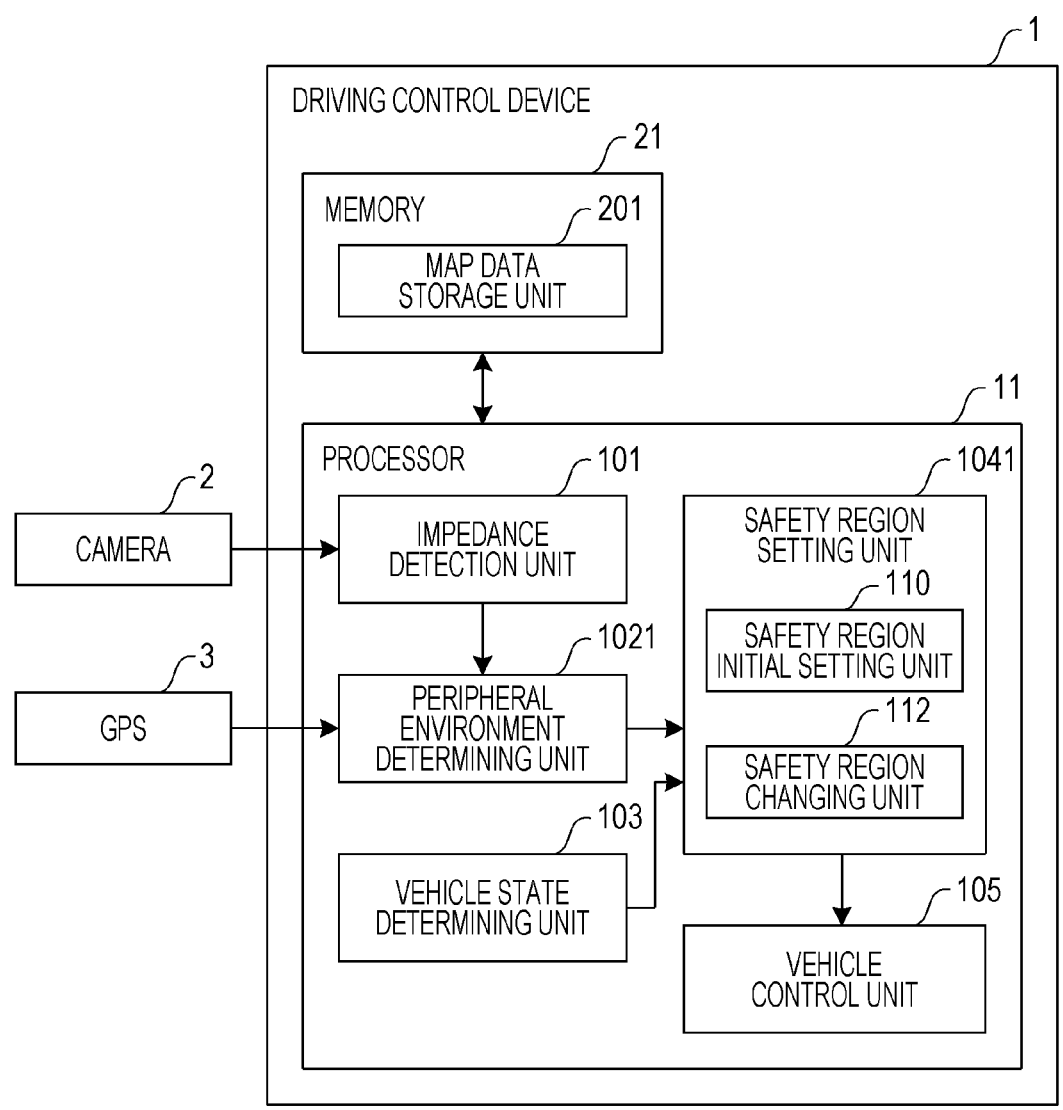
FIG. 11 is a block diagram illustrating the configuration of a vehicle control system according to a second embodiment.

FIG. 11 is a block diagram illustrating the configuration of a vehicle control system according to the second embodiment. The vehicle control system illustrated in FIG. 11 has the driving control device 1, the camera 2, and a global positioning system (GPS) 3. Note that configurations in the driving control device in FIG. 11 that are the same as those in FIG. 1 will be omitted from description. The GPS 3 is installed in the vehicle, and acquires the current position of the vehicle.

The driving control device 1 is installed in the vehicle. The driving control device 1 includes a processor 11 and memory 21. The memory 21 is a computer-readable recording medium, examples of which include a hard disk drive, ROM, RAM, optical discs, semiconductor memory, and so forth. The memory 21 stores a driving control program executed by the processor 11. The memory 21 also has a map data storage unit 201. The map data storage unit 201 stores map data (map information).

The processor 11 is, for example, a CPU, and executes the driving control program stored in the memory 21. The processor 11 includes the obstacle detecting unit 101, a peripheral environment determining unit 1021, the vehicle state determining unit 103, a safety region setting unit 1041, and the vehicle control unit 105.

The peripheral environment determining unit 1021 references the map data around the current location of the vehicle, and determines whether or not the width of the driving lane that the vehicle is currently traveling is shorter than a predetermined length. The peripheral environment determining unit 1021 also determines whether or not an obstacle is present in the direction of travel of the vehicle, based on the detection results by the obstacle detecting unit 101. The peripheral environment determining unit 1021 determines whether or not a person is present in the direction of travel of the vehicle, based on the detection results by the obstacle detecting unit 101. The peripheral environment determining unit 1021 also determines whether or not another vehicle is present in the direction of travel of the vehicle, based on the detection results by the obstacle detecting unit 101.

The safety region setting unit 1041 includes the safety region initial setting unit (region initial setting unit) 110 and safety region changing unit (region changing unit) 112. The safety region initial setting unit 110 performs initial settings of the safety region where the vehicle is stopped immediately before an obstacle is detected therein. In a case where determination is made that the vehicle has been stopped for a predetermined amount of time, the safety region changing unit 112 reduces the length of the safety region at the portion in the direction of travel by a predetermined length.

In a case where determination is made that a person is present in the direction of travel of the vehicle, and that the vehicle has been stopped for a predetermined amount of time, the safety region changing unit 112 reduces the length of the safety region in the direction of travel by a predetermined amount. In a case where determination is made that another vehicle is present in the direction of travel of the vehicle, and that the vehicle has been stopped for a predetermined amount of time, the safety region changing unit 112 reduces the length of the safety region in the direction of travel and the length in the width direction of the safety region by a predetermined amount. In a case where determination is made that a person is present in the direction of travel of the vehicle, and that the vehicle has been moving at a very slow speed for a predetermined amount of time, the safety region changing unit 112 reduces the length of the safety region in the direction of travel and the length in the width direction of the safety region by a predetermined amount. In a case where determination is made that the width of the driving lane is shorter than a predetermined length, the safety region changing unit 112 reduces the length of the width portion of the safety region, and in a case where determination is made that the width of the driving lane is equal to or longer than the predetermined length, the safety region changing unit 112 increases the length of the width portion of the safety region in accordance with the length of the width of the driving lane.

Figure 12:
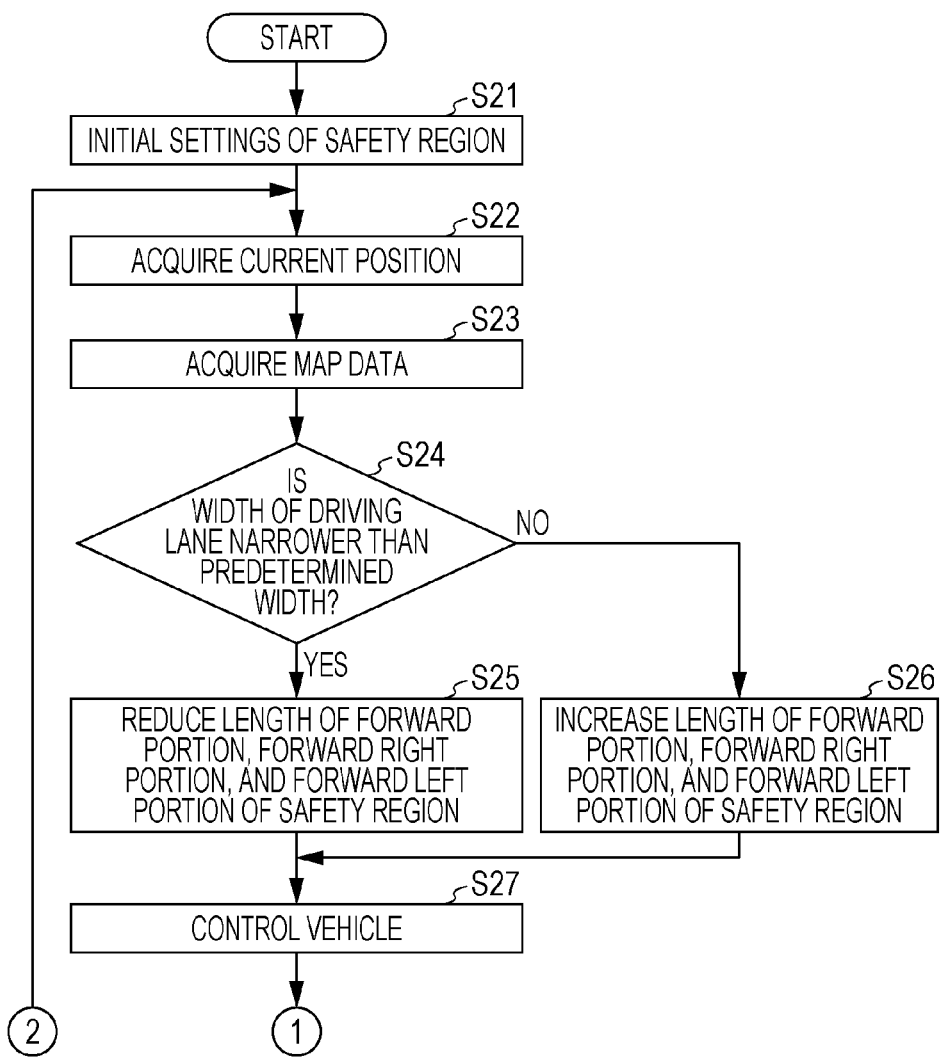
FIG. 12 is a first flowchart for describing operations of a driving control device according to the second embodiment.
Figure 13:
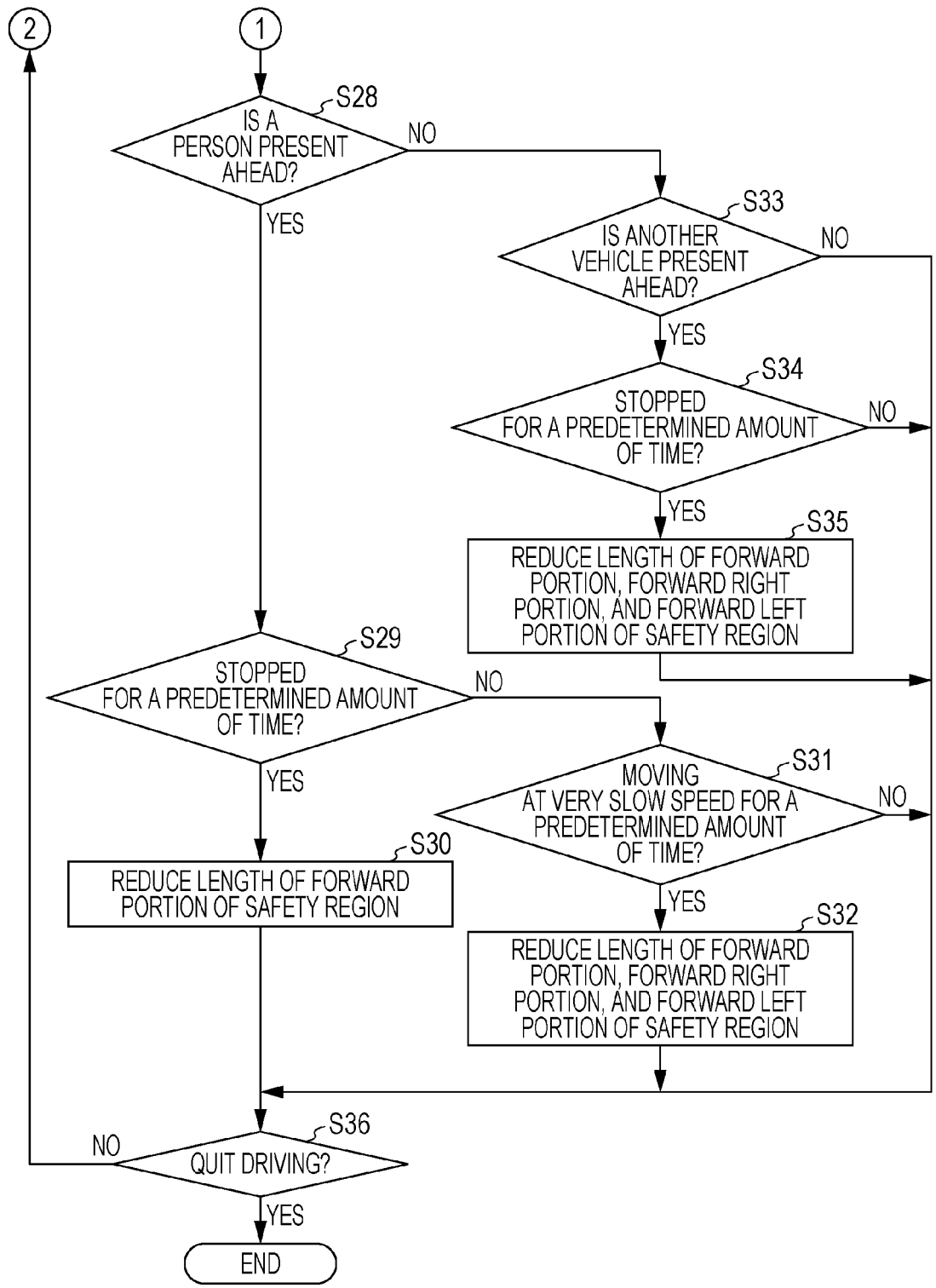
FIG. 13 is a second flowchart for describing operations of the driving control device according to the second embodiment.

Next, operations of the driving control device according to the second embodiment will be described. FIG. 12 is a first flowchart for describing operations of a driving control device according to the second embodiment, and FIG. 13 is a second flowchart for describing operations of the driving control device according to the second embodiment. The processing of step S21 is the same as the processing in step S1 in FIG. 5, so description will be omitted.

In step S22, the GPS 3 acquires the current location of the vehicle.

In step S23, the peripheral environment determining unit 1021 acquires, from the map data storage unit 201, map data around the current location of the vehicle acquired by the GPS 3.

Then in step S24, the peripheral environment determining unit 1021 references the map data around the current location of the vehicle, and determines whether or not the width of the driving lane that the vehicle is traveling in is shorter than a predetermined width. The map data indicates the state of the road at the current location, i.e., the length of the width of the driving lane.

In a case where determination is made that the width of the driving lane is shorter than the predetermined length (YES in step S24), in step S25 the safety region changing unit 112 reduces the lengths of the right portion and left portion of the safety region. The safety region changing unit 112 reduces the length of the safety region in the width direction in accordance with the width of the vehicle. On the other hand, in a case where determination is made that the width of the driving lane is equal to or longer than the predetermined length (NO in step S24), in step S26 the safety region changing unit 112 increases the lengths of the right portion and left portion of the safety region. The safety region changing unit 112 increases the length of the safety region in the width direction in accordance with the width of the driving lane, for example.

Steps S27 through S36 are the same as steps S2 through S11 in FIG. 5, so description will be omitted.

Figure 14:
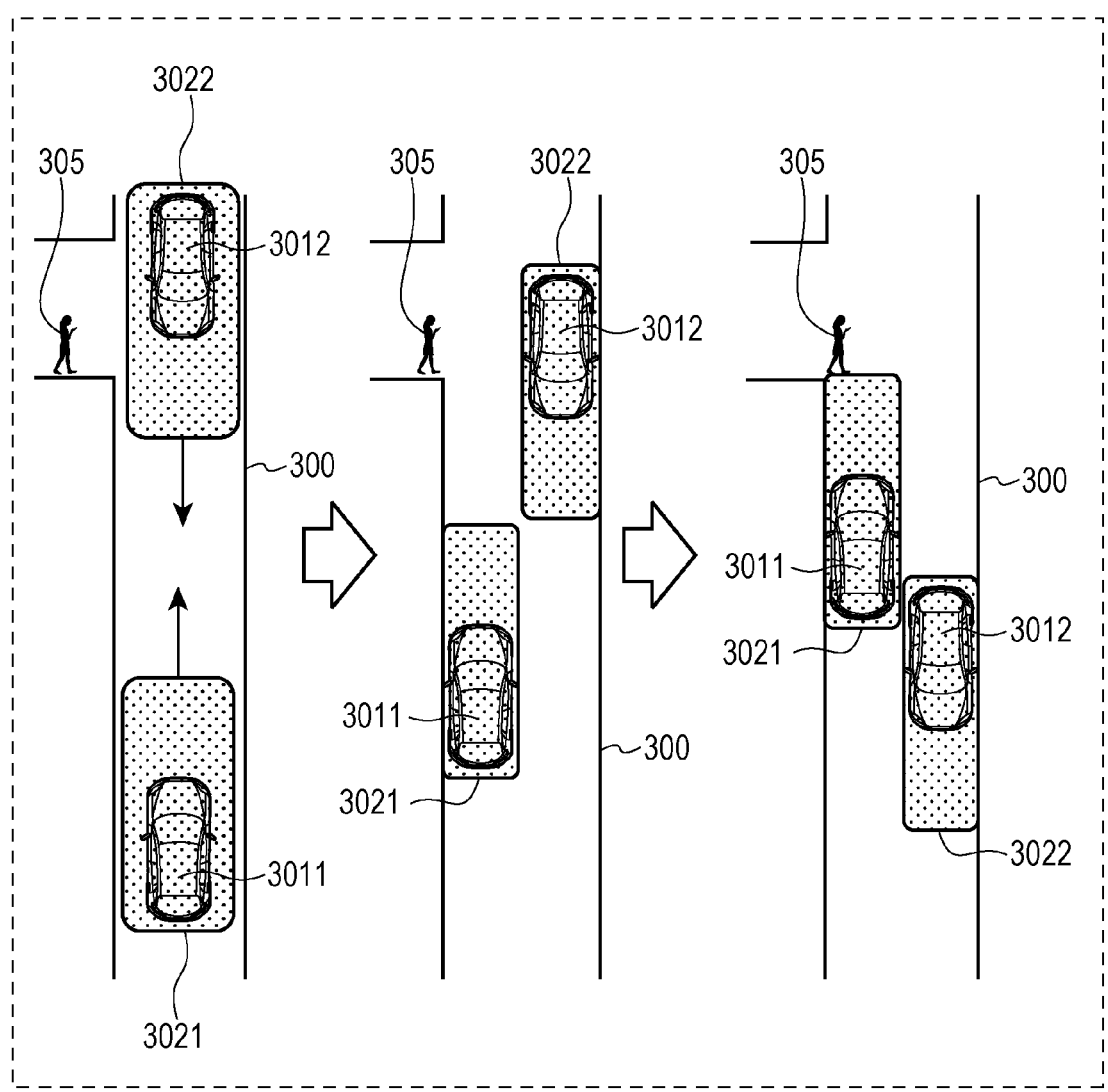
FIG. 14 is a diagram for describing processing of changing the length of the width direction portion of the safety region in accordance with the length of the width of the driving lane.

FIG. 14 is a diagram for describing processing of changing the length of the width direction portion of the safety region in accordance with the width of the driving lane. A first vehicle 3011 and a second vehicle 3012 are advancing on a road 300 toward each other, as illustrated in FIG. 14. In this case, the width of the road 300 is shorter than a predetermined length. Accordingly, the safety region changing unit 112 of the first vehicle 3011 reduces the length of the safety region 3021 in the width direction in accordance with the width of the first vehicle 3011, while the safety region changing unit 112 of the second vehicle 3012 reduces the length of the safety region 3022 in the width direction in accordance with the width of the second vehicle 3012. Thus, the first vehicle 3011 and the second vehicle 3012 can pass each other without the other vehicle entering the respective safety regions 3021 and 3022. Further, the length of the width portion of the safety region is changed in accordance with the length of the width of the driving lane, but the length of the forward portion of the safety region is not changed, so even if a person 305 appears on the road 300, the vehicle can be safely stopped.

Thus, in a case where determination is made that the width of the driving lane is shorter than a predetermined length, the length of the width portion of the safety region is reduced, so vehicles can pass each other safely on narrow roads. Also, in a case where the width of the driving lane is determined to be the predetermined length or more, the length of the width portion of the safety region is increased in accordance with the width of the driving lane, so the range in which obstacles do not enter can be made wider, thereby further improving safety.

Third Embodiment

A third embodiment will be described. In the third embodiment, the length of the safety region in the direction of travel of the vehicle is reduced in a case where a traffic rule that the vehicle should keep is being kept.

Figure 15:
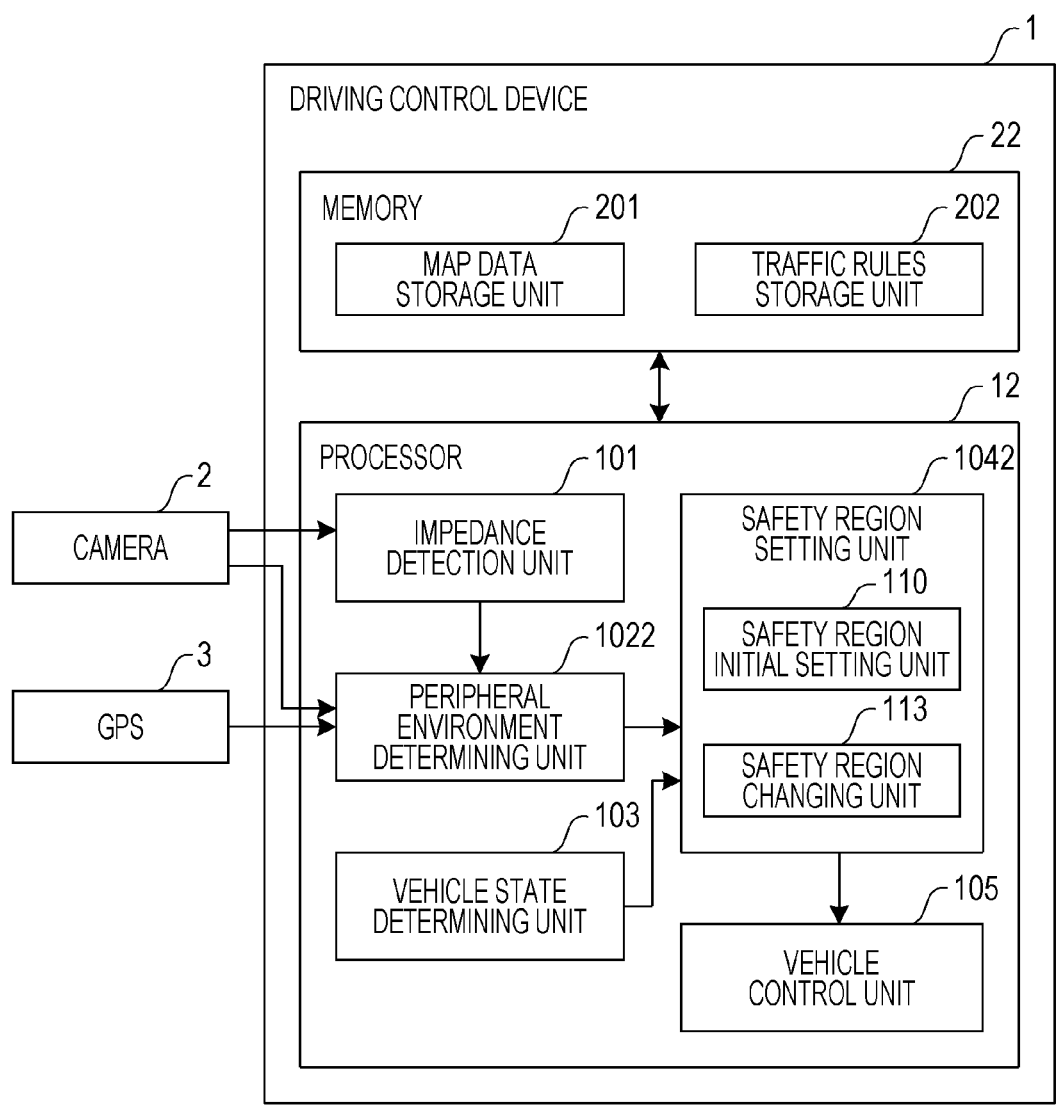
FIG. 15 is a block diagram illustrating the configuration of a vehicle control system according to a third embodiment.

FIG. 15 is a block diagram illustrating the configuration of the vehicle control system according to the third embodiment. The vehicle control system illustrated in FIG. 15 has the driving control device 1, camera 2, and GPS 3. Configurations of the vehicle control system illustrated in FIG. 15 that are the same as in FIGS. 1 and 11 will be omitted from description.

The driving control device 1 is installed in the vehicle. The driving control device 1 includes a processor 12 and memory 22. The memory 22 is a computer-readable recording medium, examples of which include a hard disk drive, ROM, RAM, optical discs, semiconductor memory, and so forth. The memory 22 stores a driving control program executed by the processor 12.

The memory 22 also includes the map data storage unit 201 and a traffic rule storage unit 202. The traffic rule storage unit 202 stores information indicating traffic rules stipulated by law that the vehicle must keep. For example, the traffic rule storage unit 202 stores traffic signs and traffic rules corresponding to the traffic signs in a correlated manner. That is to say, a traffic sign that means "stop" is correlated with a traffic rule that the vehicle must come to a stop, and a traffic sign that means "move at a very slow speed" is correlated with a traffic rule that the vehicle must drive at a very slow speed. The traffic rule storage unit 202 also stores traffic lights and traffic rules corresponding to the traffic lights in a corresponding manner, for example. That is to say, a traffic rule that says the vehicle must stop is correlated with a red signal light.

The processor 12 is, for example, a CPU, and executes the driving control program stored in the memory 22. The processor 12 includes the obstacle detecting unit 101, a peripheral environment determining unit 1022, the vehicle state determining unit 103, a safety region setting unit 1042, and the vehicle control unit 105.

The peripheral environment determining unit 1022 references the map data around the current location of the vehicle, and determines whether or not the width of the driving lane that the vehicle is currently traveling is shorter than a predetermined length. The peripheral environment determining unit 1022 also determines whether or not an obstacle is present in the direction of travel of the vehicle, based on the detection results by the obstacle detecting unit 101. The peripheral environment determining unit 1022 detects whether or not a person is present in the direction of travel of the vehicle, based on the detection results by the obstacle detecting unit 101. The peripheral environment determining unit 1022 also detects whether or not another vehicle is present in the direction of travel of the vehicle, based on the detection results by the obstacle detecting unit 101.

The peripheral environment judging unit 1022 acquires, from the traffic rule storage unit 202, traffic rules that the vehicle should keep at the current location, based on images of the periphery shot by the camera 2 or map data acquired from the map data storage unit 201. For example, in a case where an image of the periphery shot by the camera 2 includes a traffic sign, the peripheral environment judging unit 1022 recognizes this traffic sign, and acquires traffic rules corresponding to the recognized traffic sign from the traffic rule storage unit 202.

The safety region setting unit 1042 includes the safety region initial setting unit (region initial setting unit) 110 and safety region changing unit (region changing unit) 113. The safety region initial setting unit 110 performs initial settings of the safety region that is defined surrounding the vehicle, where the vehicle is stopped immediately before detecting an obstacle therein. In a case where determination is made that the vehicle has been stopped for a predetermined amount of time, the safety region changing unit 113 reduces the length of the safety region at the portion in the direction of travel by a predetermined length.

In a case where determination is made that a person is present in the direction of travel of the vehicle, and that the vehicle has been stopped for a predetermined amount of time, the safety region changing unit 113 reduces the length of the safety region in the direction of travel by a predetermined amount. In a case where determination is made that another vehicle is present in the direction of travel of the vehicle, and that the vehicle has been stopped for a predetermined amount of time, the safety region changing unit 113 reduces the length of the safety region in the direction of travel and the length in the width direction of the safety region by a predetermined amount. In a case where determination is made that a person is present in the direction of travel of the vehicle, and that the vehicle has been moving at a very slow speed for a predetermined amount of time, the safety region changing unit 113 reduces the length of the safety region in the direction of travel and the length in the width direction of the safety region by a predetermined amount. In a case where determination is made that the width of the driving lane is shorter than a predetermined length, the safety region changing unit 113 reduces the length of the width portion of the safety region, and in a case where determination is made that the width of the driving lane is equal to or longer than the predetermined length, the safety region changing unit 113 increases the length of the width portion of the safety region in accordance with the length of the width of the driving lane.

In a case where determination is made that the vehicle has been stopped for a predetermined amount of time, the safety region changing unit 113 determines whether or not the vehicle can drive based on the traffic rules at the current location, and if determination is made that the vehicle can drive, reduces the length of the direction of travel.

For example, in a case where the traffic rule is to come to a stop, and the safety region changing unit 113 judges that the vehicle has been stopped for a predetermined amount of time, the safety region changing unit 113 determines that the vehicle can drive. Also, in a case where a signal light is red, the safety region changing unit 113 determines that the vehicle cannot drive, and if the signal light is not red (the signal light is green), determines that the vehicle can drive.

Figure 16:
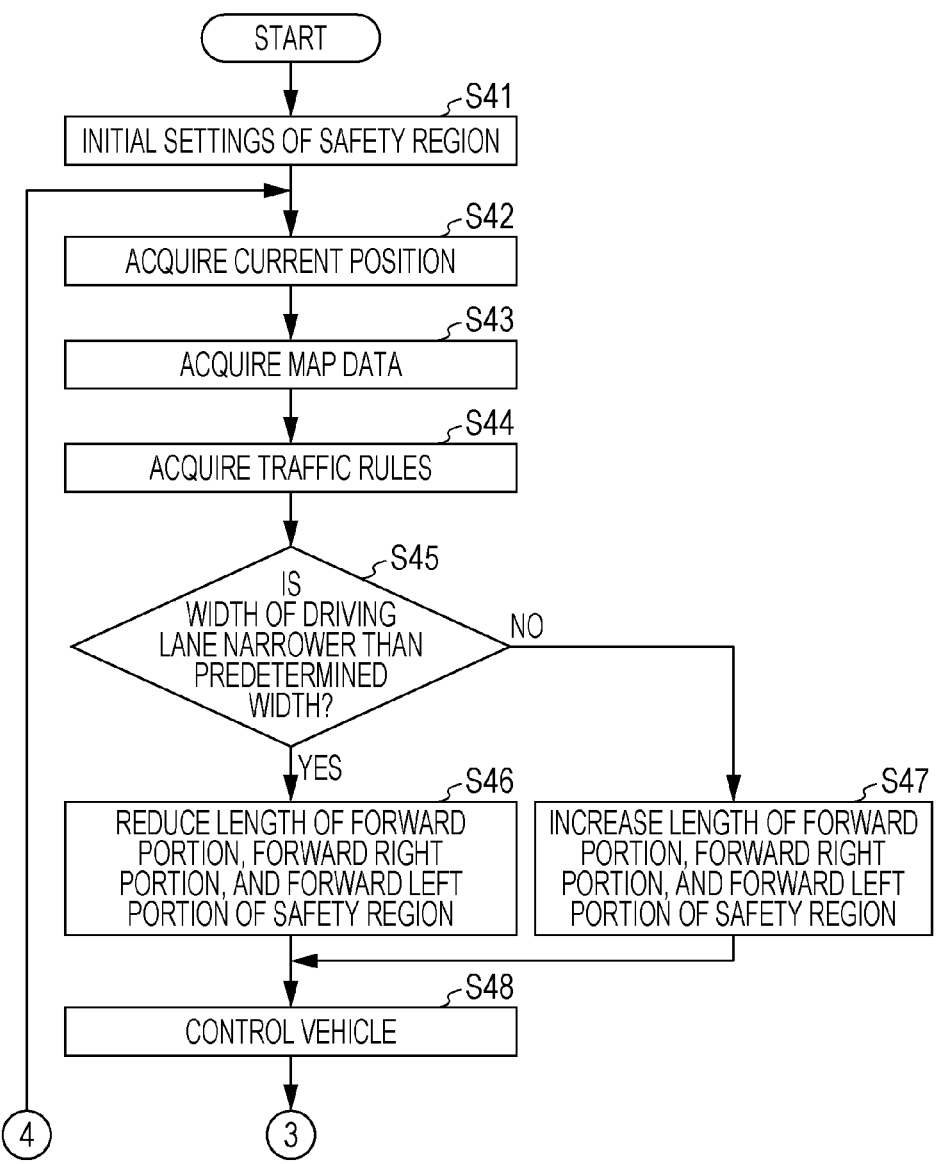
FIG. 16 is a first flowchart for describing operations of a driving control device according to the third embodiment.
Figure 17:
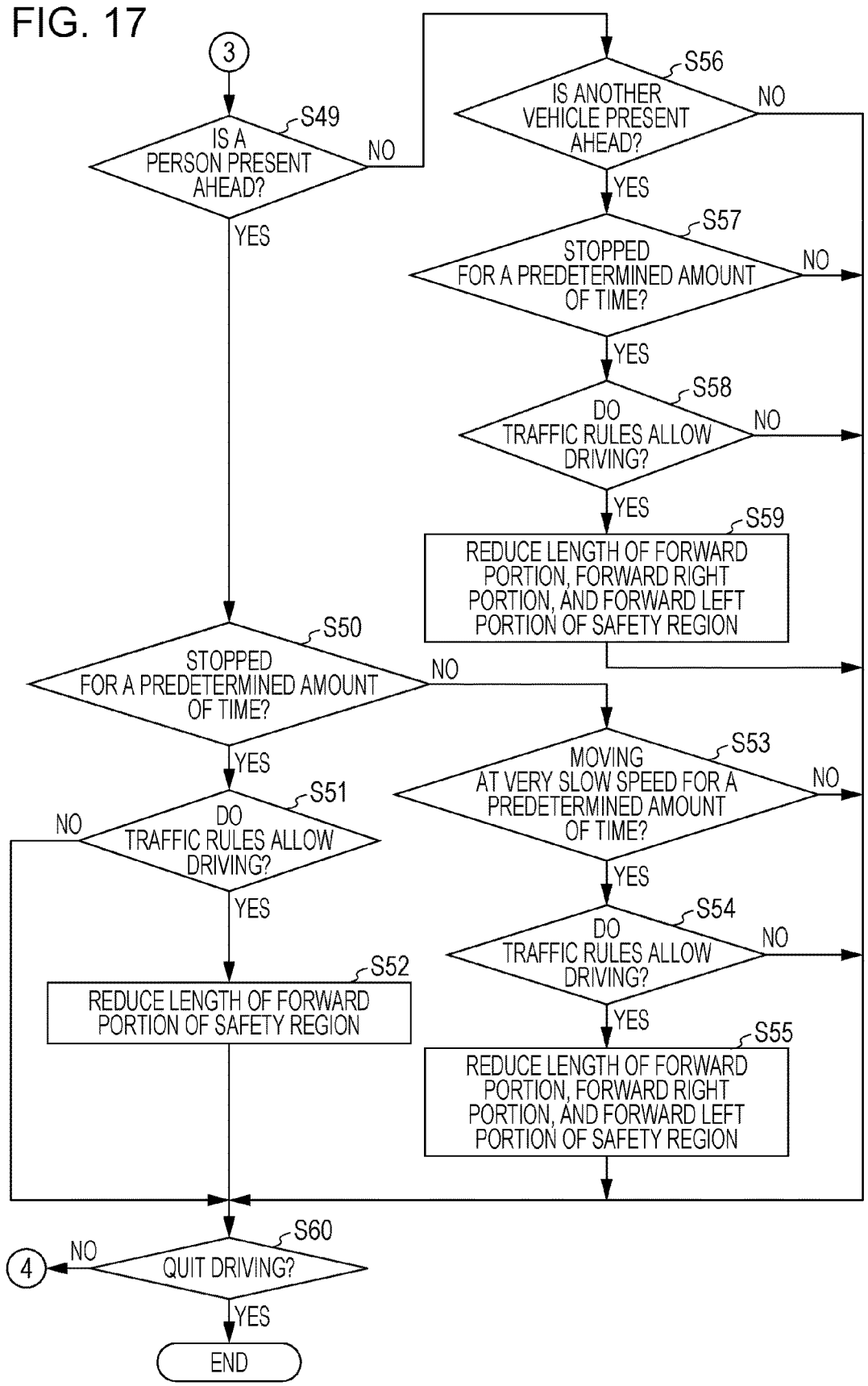
FIG. 17 is a second flowchart for describing operations of the driving control device according to the third embodiment.

Next, operations of the driving control device according to the third embodiment will be described. FIG. 16 is a first flowchart for describing operations of a driving control device according to the third embodiment, and FIG. 17 is a second flowchart for describing operations of the driving control device according to the third embodiment. The processing of steps S41 through S43 are the same as the processing in steps S21 through S23 in FIG. 12, so description will be omitted.

In step S44, the peripheral environment judging unit 1022 acquires, from the traffic rule storage unit 202, traffic rules that the vehicle should keep at the current location, based on images of the periphery shot by the camera 2 or map data acquired from the map data storage unit 201.

The processing of steps S45 through S50 are the same as the processing in steps S24 through S29 in FIGS. 12 and 13, so description will be omitted.

Next, in step S51, the safety region changing unit 113 determines whether or not the vehicle can drive, based on the traffic rules acquired by the peripheral environment judging unit 1022. In a case where determination is made that the vehicle cannot drive (NO in step S51), the flow transitions to the processing in step S60.

On the other hand, in a case where determination is made that the vehicle can drive (YES in step S51), in step S52 the safety region changing unit 113 reduces the length of the front portion of the safety region by a predetermined amount.

The processing of step S53 is the same as the processing in step S31 in FIG. 13, so description will be omitted.

In step S54, the safety region changing unit 113 determines whether or not the vehicle can drive based on traffic rules acquired by the peripheral environment judging unit 1022. In a case where determination is made that the vehicle cannot drive (NO in step S54), the flow transitions to the processing in step S60.

On the other hand, in a case where determination is made that the vehicle can drive (YES in step S54), in step S55 the safety region changing unit 113 reduces the lengths of the portions of the safety region in the front direction and the right and left directions by a predetermined amount.

The processing of steps S56 and S57 are the same as the processing in steps S33 and S34 in FIG. 13, so description will be omitted.

In step S58, the safety region changing unit 113 determines whether or not the vehicle can drive based on traffic rules acquired by the peripheral environment judging unit 1022. In a case where determination is made that the vehicle cannot drive (NO in step S58), the flow transitions to the processing in step S60.

On the other hand, in a case where determination is made that the vehicle can drive (YES in step S58), in step S59 the safety region changing unit 113 reduces the lengths of the portions of the safety region in the front direction and the right and left directions by a predetermined amount.

The processing of step S 60 is the same as the processing in step S36 in FIG. 13, so description will be omitted.

Thus, determination is made regarding whether or not the vehicle can drive based on traffic rules at the current location of the vehicle, and in a case where determination is made that the vehicle can drive, the length of the portion of the safety region in the direction of travel is reduced, so driving of the vehicle can be controlled while keeping traffic rules in a sure manner.

Fourth Embodiment

A fourth embodiment will be described. In the fourth embodiment, detection is made regarding whether or not there is an obstacle present near an external sensor installed at a position in the direction of travel of the vehicle, where the obstacle detecting unit 101 cannot detect obstacles. In a case where an obstacle is present near the external sensor, the length of the portion of the safety region in the direction of travel is increased.

Figure 18:
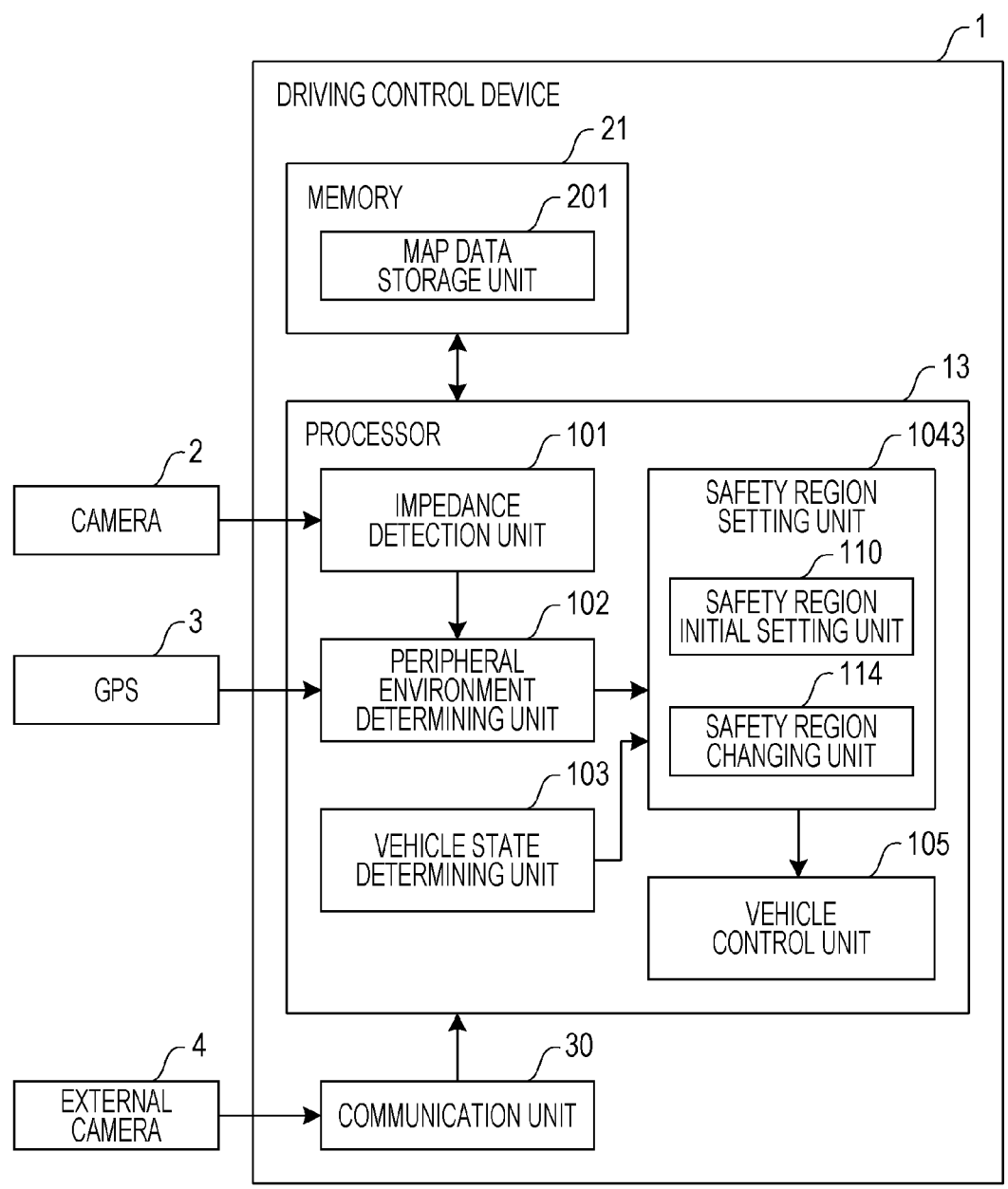
FIG. 18 is a block diagram illustrating the configuration of a vehicle control system according to a fourth embodiment.

FIG. 18 is a block diagram illustrating the configuration of the vehicle control system according to the fourth embodiment. The vehicle control system illustrated in FIG. 18 has the driving control device 1, camera 2, GPS 3, and an external camera 4. Configurations of the driving control device illustrated in FIG. 18 that are the same as in FIGS. 1 and 11 will be omitted from description.

The external camera 4 is installed at a position in the direction of travel of the vehicle, where the obstacle detecting unit 101 cannot detect obstacles, and detects obstacles present near the external camera 4. The external camera 4 transmits detection information indicating whether or not an obstacle is present near the external camera 4. The external camera 4 is, for example, a surveillance camera installed at a street-side location. The external camera 4 broadcasts detection information so as to reach a predetermined range at the periphery of the external camera 4. The external camera 4 periodically transmits detection information.

The driving control device 1 is installed in the vehicle. The driving control device 1 includes a processor 13, memory 21, and a communication unit (detection information acquisition unit) 30.

The communication unit 30 receives detection information transmitted by the external camera 4. The communication unit 30 receives detection information indicating whether or not there is an obstacle present near the external camera 4, from the external camera 4 installed at a position in the direction of travel of the vehicle and where the obstacle detecting unit 101 cannot detect obstacles. Although the driving control device 1 is described as being communicably connected to one external camera 4 in the fourth embodiment, the present disclosure is not restricted to this arrangement, and may be communicably connected to multiple external cameras 4.

The processor 13 is, for example, a CPU, and executes the driving control program stored in the memory 21. The processor 13 includes the obstacle detecting unit 101, the peripheral environment judging unit 102, the vehicle state determining unit 103, a safety region setting unit 1043, and the vehicle control unit 105.

The safety region setting unit 1043 includes the safety region initial setting unit (region initial setting unit) 110 and a safety region changing unit (region changing unit) 114. In a case where determination is made by the peripheral environment judging unit 102 that no obstacle is present in the direction of travel of the vehicle, and detection information indicating that an obstacle is present has been acquired by the communication unit 30, the safety region changing unit 114 increases the length of the portion of the safety region in the direction of travel. The external camera 4 is situated at a location that is a blind spot from the vehicle, so in a case where detection information that indicates that an obstacle is present is acquired by the communication unit 30, the probability that an obstacle will emerge from a place that is a blond spot to the vehicle is high. Accordingly, increasing the length of the portion of the safety region in the direction of travel enables stopping with a larger distance as to the obstacle, thereby improving safety.

Also, in a case where determination is made by the peripheral environment judging unit 102 that no obstacle is present in the direction of travel of the vehicle, and detection information indicating that no obstacle is present has been acquired by the communication unit 30, the safety region changing unit 114 changes the speed calculation expression used by the vehicle control unit 105 to a speed calculation expression where the speed of the vehicle is faster. More specifically, the safety region changing unit 114 increases the value of the coefficient in the above Expression (1). That is to say, in a case where no obstacle is detected by the vehicle, and the external camera 4 installed at a position that is a blind spot from the vehicle also detects no obstacle, the probability of an obstacle suddenly appearing is low, so safety can be sufficiently ensured even if the vehicle travels faster.

Note that the detection information may include position information indicating the position of the external camera 4. Accordingly, the external camera 4 installed in the direction of travel of the vehicle can be identified from the map data, and where on the map the obstacle exists can be identified.

Figure 19:
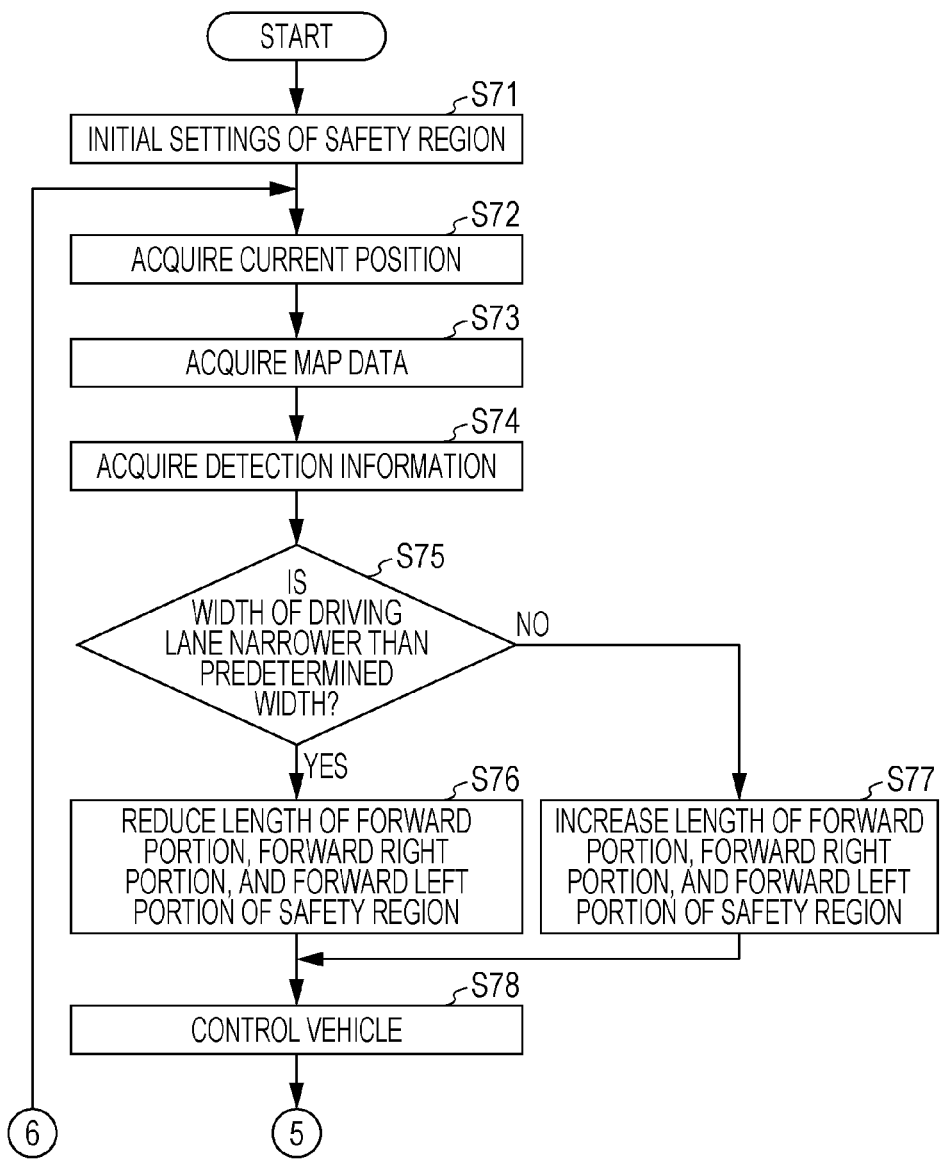
FIG. 19 is a first flowchart for describing operations of a driving control device according to the fourth embodiment.
Figure 20:
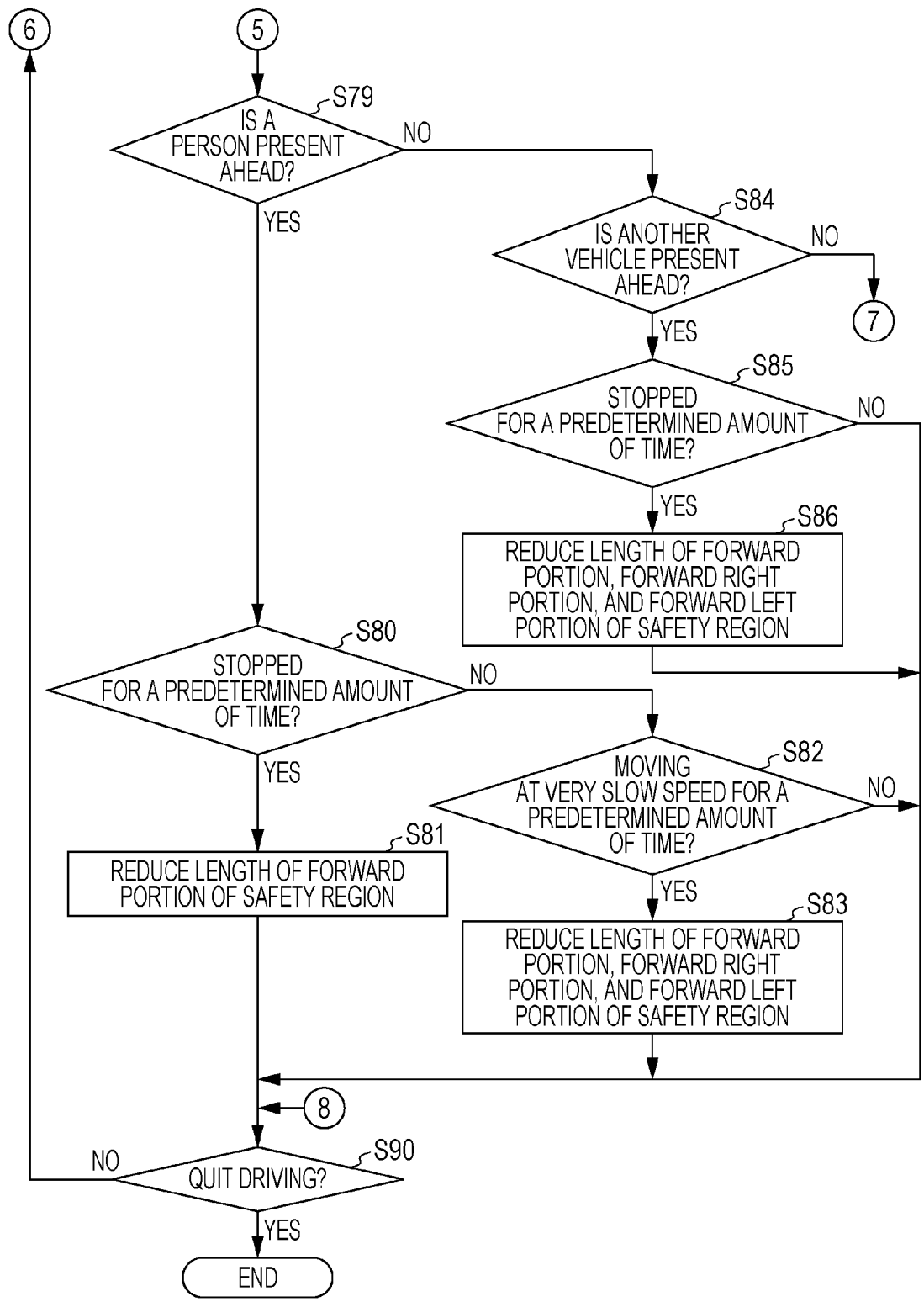
FIG. 20 is a second flowchart for describing operations of the driving control device according to the fourth embodiment.
Figure 21:
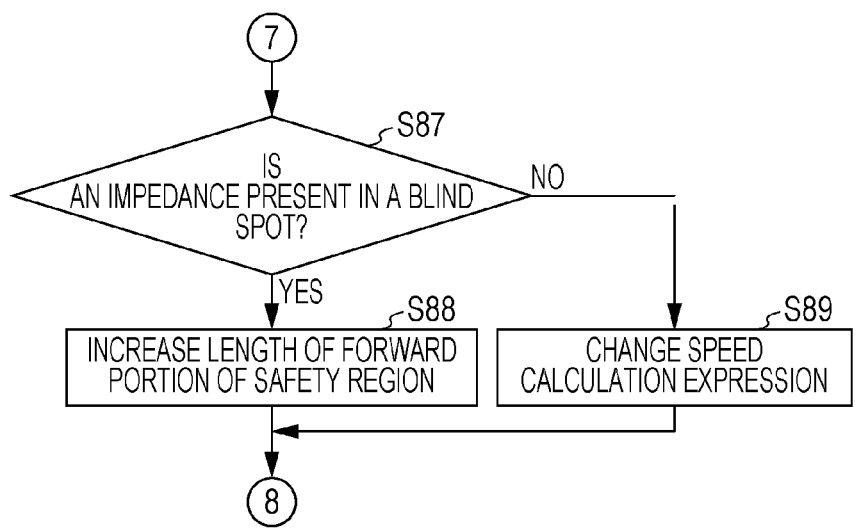
FIG. 21 is a third flowchart for describing operations of the driving control device according to the fourth embodiment.

Next, operations of the driving control device according to the fourth embodiment will be described. FIG. 19 is a first flowchart for describing operations of a driving control device according to the fourth embodiment, FIG. 20 is a second flowchart for describing operations of the driving control device according to the fourth embodiment and FIG. 21 is a third flowchart for describing operations of the driving control device according to the fourth embodiment. The processing of steps S71 through S73 are the same as the processing in steps S21 through S23 in FIG. 12, so description will be omitted.

In step S74, the communication unit 30 acquires detection information transmitted by the external camera 4.

The processing of steps S75 through S86 are the same as the processing in steps S24 through S35 in FIGS. 12 and 13, so description will be omitted.

In a case where determination is made in step S84 that another vehicle is not present ahead (NO in step S84), in step S87 the safety region changing unit 114 determines whether or not an obstacle such as a person or vehicle or the like is present in a blind spot in the direction of travel of the vehicle, based on the detection information received from the external camera 4.

In a case where determination is made that an obstacle is present in a blind spot (YES in step S87), in step S88 the safety region changing unit 114 increases the length of the forward portion of the safety region. On the other hand, in a case where determination is made that no obstacle is present in the blind spot (NO in step S87), in step S89 the safety region changing unit 114 changes the speed calculation expression used by the vehicle control unit 105 to a speed calculation expression where the speed of the vehicle is faster.

The processing of step S90 is the same as the processing in step S36 in FIG. 13, so description will be omitted.

Figure 22:
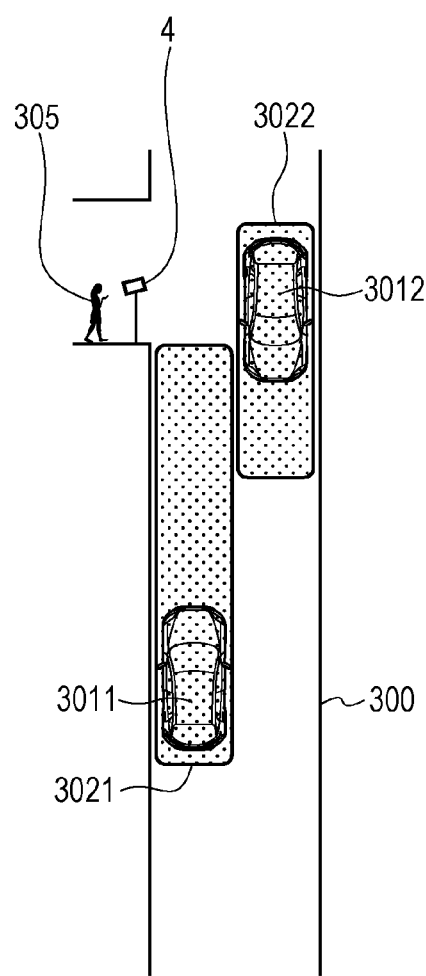
FIG. 22 is a diagram for describing processing of increasing the length of the safety region in the direction of travel in a case where there is an obstacle in a blind spot in the direction of travel of the vehicle.

FIG. 22 is a diagram for describing processing of increasing the length of the safety region in the direction of travel in a case where there is an obstacle in a blind spot in the direction of travel of the vehicle. As illustrated in FIG. 22, the external camera 4 detects a person 305 present near the external camera 4, and transmits detection information indicating that a person 305 is present near the external camera 4 to the driving control device 1. The safety region changing unit 114 determines whether or not an obstacle is present in a blind spot in the direction of travel of the vehicle 3011, based on the detection information received from the external camera 4. At this time, the detection information indicates that the person 305 is present, so the safety region changing unit 114 determines that an obstacle is present in a blind spot in the direction of travel of the vehicle, and increases the length of the forward portion of the safety region 3021.

Figure 23:
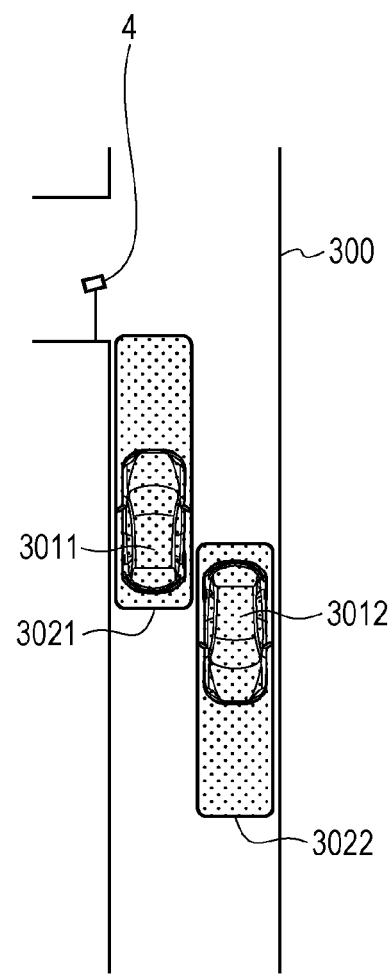
FIG. 23 is a diagram for describing processing of changing a speed calculation expression used by the driving control unit, in a case where there is no obstacle in a blind spot in the direction of travel of the vehicle.

FIG. 23 is a diagram for describing processing of changing a speed calculation expression used by the driving control unit, in a case where there is no obstacle in a blind spot in the direction of travel of the vehicle. As illustrated in FIG. 23, there is no obstacle present near the external camera 4. Accordingly, the external camera 4 transmits detection information indicating that no obstacle is present near the external camera 4 to the driving control device 1. The safety region changing unit 114 determines whether or not there is an obstacle present in a blind spot in the direction of travel of the vehicle 3011, based on the detection information received from the external camera 4. The safety region changing unit 114 determines that no obstacle is present in a blind spot in the direction of travel of the vehicle 3011 at this time, since the detection information indicates that no obstacle is present, so the safety region changing unit 114 changes the speed calculation expression used by the vehicle control unit 105 to a speed calculation expression where the speed of the vehicle is faster.

While the safety region has been expressed as being a single rectangular region surrounding the vehicle in the first through fourth embodiments, the present disclosure is not restricted to this arrangement in particular; the safety region may be represented as multiple divided regions formed around the vehicle.

Figure 24:
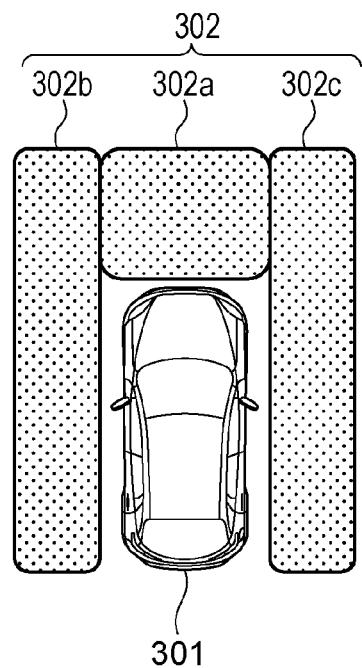
FIG. 24 is a diagram illustrating an example of a safety region formed in front of and to the sides of the vehicle, in a modification of the first through fourth embodiments.
Figure 25:
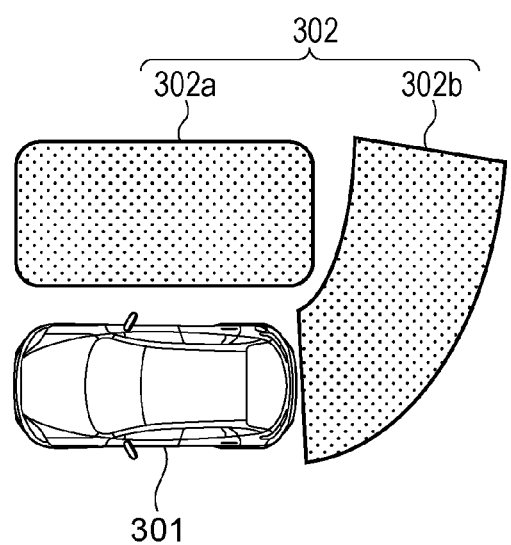
FIG. 25 is a diagram illustrating an example of a safety region formed to the sides of and at the rear of the vehicle, in a modification of the first through fourth embodiments.

FIG. 24 is a diagram illustrating an example of a safety region formed in front of and to the sides of the vehicle, in a modification of the first through fourth embodiments, and FIG. 25 is a diagram illustrating an example of a safety region formed to the sides of and at the rear of the vehicle, in a modification of the first through fourth embodiments.

The safety region 302 may include a first divided safety region 302a defined in front of the vehicle 301, a second divided safety region 302b defined to the left of the vehicle 301, and a third divided safety region 302c defined to the right of the vehicle 301, as illustrated in FIG. 24. In this case, the vehicle control unit 105 may calculate the speed of the vehicle based on the following Expression (2).

$$\text{Speed} = \Sigma(\text{area of each divided safety region} \times \text{coefficient of each divided safety region}) \qquad (2)$$

That is to say, the vehicle control unit 105 may calculate a value obtained by adding a value where the area of the first divided safety region 302a has been multiplied by a coefficient corresponding to the first divided safety region 302a, a value where the area of the second divided safety region 302b has been multiplied by a coefficient corresponding to the second divided safety region 302b, and a value where the area of the third divided safety region 302c has been multiplied by a coefficient corresponding to the third divided safety region 302c, as the speed vehicle 301.

Alternatively, the safety region 302 may include a first divided safety region 302a defined to the right of the vehicle 301, and a second divided safety region 302b defined behind the vehicle 301, as illustrated in FIG. 25. In FIG. 25, the vehicle 301 is backing up toward the right rear side, so the shape of the second divided safety region 302b is curved instead of being a rectangle. In this case as well, the vehicle control unit 105 may calculate the vehicle speed based on the above Expression (2).

The memory in the first through fourth embodiments may store multiple safety regions of different sizes beforehand, and the safety region changing unit may select a safety region to be set around the vehicle out of multiple safety region.

The obstacle detecting unit 101 according to the first through fourth embodiments is described as detecting obstacles that are present in the periphery of the vehicle, based on images shot by the camera 2, but the present disclosure is not restricted to this in particular, and the obstacle detecting unit 101 may detect obstacles that are present in the periphery of the vehicle based on information obtained by other sensors, such as a millimeter wave sensor, a Light Detection And Ranging (LIDAR) sensor, or some other sensor.

Note that in the present disclosure, all or part of units, devices, members, or parts, of all or part of the functional blocks illustrated in the block diagrams, may be carried out by one or multiple electronic circuits including semiconductor devices, integrated circuits (IC), or large scale integration (LSI). LSIs and ICs may be integrated on a single chip, or may be configured as a combination of multiple chips. For example, the functional blocks other than the storage device may be integrated on a single chip. LSIs and ICs may be referred to as, for example, system LSI, very large scale integration (VLSI), or ultra large scale integration (ULSI), depending on the degree of integration thereof. Field programmable gate arrays (FPGA) programmed after manufacturing of the LSI, and reconfigurable logic devices capable of reconfiguration of junctions within the LSI or setup of circuit sections within the LSI, can be used to the same end.

Further, all or part of functions or operations of the units, devices, members, or parts, may be executed by software processing. In this case, the software is recorded in a non-transitory recording medium such as one or multiple ROMs, optical discs, hard disk drives, or the like, and when the software is executed by a processing device (processor), the functions specified by that software are executed by the processing device (processor) and peripheral devices. The system or device may have one or multiple non-transitory recording mediums in which software is recorded, a processing device (processor), and necessary hardware devices such as an interface, for example.

The driving control device, driving control method, and driving control program according to the present disclosure, can change a distance to be maintained as to obstacles in accordance with the surrounding environment, and driving of the vehicle can be controlled so as to not impede passage of other vehicles, and thus are useful as a driving control device that controls driving of a vehicle that moves autonomously, a driving control method, and a driving control program.

What is claimed is:

1. A controller that controls driving of an autonomously moving vehicle, the controller comprising:
a first sensor that detects an obstacle present in a periphery of the vehicle, and detects a direction of travel of the vehicle; and
a processor that
sets a virtual region surrounding the periphery of the vehicle, the processor configured to stop the vehicle when changing from a state where the obstacle is not detected within the virtual region to a state where the obstacle is detected within the virtual region,
determines whether or not the obstacle is present in the direction of travel of the vehicle,
determines whether or not the vehicle has been stopped for a predetermined amount of time or longer when the obstacle is determined to be present in the direction of travel of the vehicle,
reduces a length of the virtual region in the direction of travel to provide an adjusted virtual region when the vehicle is determined to have been stopped for the predetermined amount of time or longer,
causes the vehicle to drive when the obstacle is not detected within the adjusted virtual region, and
stops the vehicle when changing from a state where the obstacle is not detected within the adjusted virtual region to a state where the obstacle is detected within the adjusted virtual region.

2. The controller according to claim 1,
wherein the obstacle is a person.

3. The controller according to claim 1,
wherein the obstacle is another vehicle, and
wherein the processor further
reduces a width of the virtual region when the vehicle is determined to have been stopped for the predetermined amount of time or longer.

4. The controller according to claim 1,
wherein, the processor further
determines whether or not the vehicle has been driving at a predetermined speed or slower for a predetermined amount of time or longer when the vehicle is determined not to have been stopped for the predetermined amount of time or longer, and
reduces a width of the virtual region when the vehicle is determined to have been driving at the predetermined speed or slower for the predetermined amount of time or longer.

5. The controller according to claim 1, further comprising:
a memory that stores map information,
wherein the map information includes information of roads included in the map, and a width of each driving lane making up the roads, and
wherein the processor further
determines whether or not a width of a driving lane that the vehicle is traveling on is narrower than a predetermined width, based on a current GPS location of the vehicle and the map information,
reduces a width of the virtual region when the width of the driving lane is determined to be narrower than the predetermined width, and
increases the width of the virtual region when the width of the driving lane is determined to be equal to or wider than the predetermined width.

6. The controller according to claim 1, further comprising:
a second sensor that detects a steering angle of the vehicle,
wherein the processor further
modifies a portion of the virtual region to have a radial angle in accordance with the detected steering angle and the direction of travel.

7. The controller according to claim 1,
wherein the processor further
controls a driving speed of the vehicle in accordance with a size of the virtual region.

8. The controller according to claim 1, further comprising:
a memory,
wherein the memory stores a correlation between various traffic signs and traffic rules corresponding to the traffic signs, and
wherein the processor further
recognizes a sign included in an image captured by a camera provided to the vehicle when the vehicle is determined to have been stopped for the predetermined amount of time of longer,
extracts a traffic rule corresponding to the recognized sign based on the correlation,
determines whether or not the vehicle can drive under the extracted traffic rule, and reduces a length of the virtual region in the direction of travel when it is determined that the vehicle can drive under the extracted traffic rule.

9. The controller according to claim 1, wherein the processor further
receives detection results, from a third sensor that is installed outside of the vehicle, in the direction of travel of the vehicle, and has a different detection range from the first sensor, indicating whether or not the obstacle is present at a periphery of the third sensor, and
increases a length of the virtual region in the direction of travel, when detection results from the first sensor indicate that the obstacle is not present in the direction of travel of the vehicle, and the detection results received from the third sensor indicate that the obstacle is present at the periphery of the third sensor.

10. A method of controlling driving of an autonomously moving vehicle, the method comprising:
setting a virtual region surrounding a periphery of the vehicle using a processor included in the vehicle, the processor configured to stop the vehicle when changing from a state where the obstacle is not detected within the virtual region to a state where the obstacle is detected within the virtual region;
determining, using the processor, whether or not the obstacle is present in the direction of travel of the vehicle;
determining, using the processor, whether or not the vehicle has been stopped for a predetermined amount of time or longer when the obstacle is determined to be detected in the direction of travel of the vehicle;
reducing a length of the virtual region in the direction of travel to provide an adjusted virtual region when the vehicle is determined to have been stopped for the predetermined amount of time or longer;
causing the vehicle to drive when the obstacle is not detected within the adjusted virtual region; and
stopping the vehicle when changing from a state where the obstacle is not detected within the adjusted virtual region when the obstacle is detected within the adjusted virtual region.

11. A non-transitory computer-readable recording medium storing a program controlling driving of an autonomously moving vehicle, the program causing a processor to
set a virtual region surrounding a periphery of the vehicle, the processor configured to stop the vehicle when changing from a state where the obstacle is not detected within the virtual region to a state where the obstacle is detected within the virtual region,
determine whether or not the obstacle is present in the direction of travel of the vehicle,
determine whether or not the vehicle has been stopped for a predetermined amount of time or longer when the obstacle is determined to be detected in the direction of travel of the vehicle,
reduce a length of the virtual region in the direction of travel to provide an adjusted virtual region when the vehicle is determined to have been stopped for the predetermined amount of time or longer,
cause the vehicle to drive when the obstacle is not detected within the adjusted virtual region, and
stop the vehicle when changing from a state where the obstacle is not detected within the adjusted virtual region to a state where the obstacle is detected within the adjusted virtual region.

* * * * *